United States Patent
Mori et al.

(10) Patent No.: US 6,389,224 B2
(45) Date of Patent: *May 14, 2002

(54) WIRELESS COMMUNICATION DEVICE HAVING A RECONFIGURABLE MATCHING CIRCUIT

(75) Inventors: Kenji Mori; Kazuyasu Imahashi; Kentaro Tanaka; Toshiaki Setogawa; Hiroyuki Yamauchi, all of Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/860,110

(22) PCT Filed: Oct. 17, 1996

(86) PCT No.: PCT/JP96/03016

§ 371 Date: Nov. 28, 1997

§ 102(e) Date: Nov. 28, 1997

(87) PCT Pub. No.: WO97/15143

PCT Pub. Date: Apr. 24, 1997

(30) Foreign Application Priority Data

Oct. 17, 1995 (JP) .............................................. 7-268420
Apr. 12, 1996 (JP) .............................................. 8-091315

(51) Int. Cl.[7] .............................................. H04N 5/917
(52) U.S. Cl. ........................ 386/111; 386/112; 348/700; 375/240.03
(58) Field of Search ................................. 386/4, 33, 52, 386/64, 109, 111, 112, 69, 81; 348/419, 700, 405, 699; 375/240.03

(56) References Cited

U.S. PATENT DOCUMENTS

| | | | |
|---|---|---|---|
| 5,418,658 A | * 5/1995 | Kwom | 360/48 |
| 5,594,598 A | * 1/1997 | Shikakura | 360/49 |
| 5,602,956 A | * 2/1997 | Suzuki et al. | 386/68 |
| 5,614,960 A | * 3/1997 | Chiba et al. | 348/700 |
| 5,684,714 A | * 11/1997 | Yogeshwar et al. | 348/405 |
| 5,706,386 A | * 1/1998 | Miyazawa | 386/52 |
| 5,721,589 A | * 2/1998 | Murata | 348/405 |
| 5,742,730 A | * 4/1998 | Couts et al. | 386/69 |

FOREIGN PATENT DOCUMENTS

| | | |
|---|---|---|
| JP | 1-200793 | 8/1989 |
| JP | 3-217183 | 9/1991 |
| JP | 4-2291 | 1/1992 |

* cited by examiner

Primary Examiner—Wendy R. Garber
Assistant Examiner—Christopher Onuaku
(74) Attorney, Agent, or Firm—Frommer Lawrence & Haug LLP; William S. Frommer; Bruno Polito

(57) ABSTRACT

It is made possible to record, on a recording medium on which original image data before compression is recorded, data resulting from a first coding processing performed when coding the data by a variable rate compression and coding system and to code quickly in real time when performing a second coding processing from that recording medium. Video data is reproduced by a VTR 300 from a master video tape 10 on which source video data is recorded and the first coding processing is carried out at a compressing and coding apparatus 100. The bit rate, allocation data, etc. obtained by this coding processing are stored in a predetermined region of the master video tape 10 via the VTR 300. When the master video tape 10 is used, the second coding processing can be quickly carried out without reading the bit rate data etc. from another apparatus.

19 Claims, 12 Drawing Sheets

WIRELESS COMMUNICATION DEVICE HAVING A RECONFIGURABLE MATCHING CIRCUIT

TECHNICAL FIELD

The present invention relates to an audio and/or video data coding and recording apparatus for variable length coding noncompressed audio and/or video data by a compressing and coding system such as the MPEG (Moving Picture coding Experts Group) method and recording the same on a conventionally existing recording medium such as a magneto-optical disk (MO) and hard disk (HD) or a new recording medium such as a digital video disk (DVD).

BACKGROUND ART

When reading out source data (stock data) from a recording medium of a video tape (master video tape) on which program data and other uncompressed and uncoded original audio and/or video data (source data or stock data) have been recorded for the purpose of compression and coding, usually, to prepare against unforeseen situations, the practice has been to reproduce the source data from a master video tape, copy it onto another VTR tape (work video tape), and further reproduce the source data from the work video tape for compression and coding.

Further, as the compression and coding system used when compressing and coding audio and/or video data and recording the same on a recording medium such as a magneto-optical disk (MO) or a digital video disk (DVD) or transmitting the same to another apparatus, a fixed rate (fixed length) compression and coding system and a variable rate (variable length) compression and coding system have been known.

Below, an explanation will be made of the variable rate compression and coding system and the fixed rate compression and coding system by taking as an example a case of compressing and coding video data. Note that, the compression and coding of audio data can be considered basically similar to the compression and coding of video data, but audio data generally consists of a smaller amount of data than video data and can be more easily compressed and coded than video data, therefore the compression and coding of the audio data will not be referred to here.

In the fixed rate compression and coding system, the compression and coding rate (bit rate) is always constant.

On the other hand, in the variable rate compression and coding system, in order to maintain the quality of the picture as a whole when expanding and decoding the compressed and coded data (compressed data), the compression and coding rate is changed based on the complexity of the picture and motion. For example, if variable rate compression and coding are performed on a relatively difficult part where the motion of the source data is vigorous, the amount of generated data becomes larger (bit rate becomes higher), while if the variable rate compression and coding is performed on a relatively simple part where the motion of the source data is small, the amount of generated data becomes smaller (bit rate becomes lower).

When considering the quality of the video after the expansion and decoding, when using the variable rate compression and coding system, it is possible to allocate a larger amount of data for the compression and coding of a complex picture and allocate a smaller amount of data for the compression and coding of a simple picture, therefore the compression and coding can be carried out while maintaining a uniform picture for the picture as a whole.

When performing the compression and coding by the fixed rate compression and coding system, however, at a part where the picture is complex and the motion is vigorous (picture pattern is complex) and therefore the amount of information is large, the fixed amount of data allocated to that part is not enough to maintain a sufficient quality of the picture. Conversely, in a part where the picture is simple and the motion is mild (picture pattern is simple) and therefore the amount of information is small, the fixed amount of data becomes excessive with respect to the amount required for maintaining a sufficient quality of the picture.

Accordingly, in general, the quality of the picture after the expansion and decoding becomes higher in the case where the variable rate compression and coding system is used in comparison with the case where the fixed rate compression and coding system is used.

When considering the amount of the data after compression, when using the fixed rate compression and coding system, since the source data is compressed and coded by a constant compression and coding rate, the amount of data after compression and coding can be correctly estimated from the amount of the source data before the compression and coding. Accordingly, the recording medium having the recording capacity necessary for recording the data after compression and coding can be easily selected.

On the other hand, as mentioned above, if the fixed rate compression and coding system is used, since the compression and coding are carried out with the same compression and coding rate both for a part where the pattern of the source data is complex and for a part where the pattern is simple, the quality of the picture at the part where the pattern of the source data is complex becomes poor.

Further, in the fixed rate compression and coding system, since the amount of data after the compression and coding changes in accordance with the value of the compression and coding rate, when the storage capacity of the recording medium for recording the compressed data is small, the compression and coding rate must be lowered and thus the quality of the overall picture after expansion and decoding becomes low. Accordingly, in order to maintain a high quality of the picture after the expansion and decoding, the recording capacity of the recording medium must be made large.

When using the variable rate compression and coding system, the compression and coding are carried out while adaptively changing the compression and coding rate in accordance with the complexity of the pattern. That is, in the variable rate compression and coding system, the part where the pattern of the source data is difficult is compressed and coded with a low compression and coding rate, while the video data of the part where the pattern is simple is compressed and coded with the high compression and coding rate.

Accordingly, if the variable rate compression and coding system is used, the quality of the picture after the expansion and decoding can be improved in comparison with the case where the fixed rate compression and coding system is used.

When the variable rate compression and coding system is used, however, the amount of data after the compression and coding cannot be estimated definitively from the amount of the source data before the compression. Accordingly, with just a single compression and coding processing, the source data cannot be reliably compressed and coded to an amount of data less than the recording capacity of a DVD (digital video disc device) or other recording medium and reliably recorded on the same.

The fixed rate compression and coding system and the variable rate compression and coding system have their advantages and disadvantages as mentioned above, but a recent trend has been for the greater use of the variable rate compression and coding system, which gives a higher quality of the picture as a whole after the expansion and decoding, in comparison with the fixed rate compression and coding system. As representative variable rate compression and coding systems, the MPEG system (system of compression and coding of moving pictures developed by the Moving Picture Coding Experts Group) as represented by MPEG1 and MPEG2 have been known.

In order to record compressed data on a DVD or other recording medium, it is necessary to properly set the compression and coding rate (bit rate) and to compress and code the data and record the compressed data so that the compressed data can be accommodated in the recording medium. For this reason, a two-path system mentioned below is applied.

First, compression and coding process is carried out for determining the compression and coding rate so that the amount of the data after the compression and coding becomes less than the recording capacity of the DVD or other recording medium is carried out(first compression and coding processing). That is, processing for allocating the amounts of data to the parts of the source data is carried out calculating back from the recording capacity of the recording medium so that all of the compressed data can be recorded on the recording medium.

Next, referring to the amounts of data allocated to the parts of the source data, precise compression and coding processing (second compression and coding processing) is carried out again so that the amounts of data after the compression and coding become the amounts of data allocated to these parts to thereby generate the compressed data which is then recorded on the DVD or other recording medium.

More concretely, for example, the source data is divided into scenes of every time $t_{scene}$, an amount of data d(i) suited to a scene is allocated for every scene $i$, and, based on the ratio of that amount of data d(i) occupied in the overall video data, a bit rate that satisfies for example the following Equation 1 is found for each scene. Then, the compression and coding of that scene are carried out with that bit rate.

$$R_v(i) = t_{scene} \leq (S \times (d(i)/D)) \quad (1)$$

where, $R_v(i)$ is a compression and coding bit rate of the video data of the scene $i$, $t_{scene}$ is the time of the scene $i$, S is the capacity of the recording medium, $i$ is the number of the scene, d(i) is the compressed amount of the video data of the scene $i$, and D is the amount of the entire video data, where $D = \Sigma d(i)$.

Since such a two-path system of a variable rate compression and coding system performs the compression and coding processing twice, it suffers from the following disadvantages.

Since it is necessary to perform the compression and coding processing twice, a long time is taken for the compression and coding processing and also much labor is involved on the part of the workers performing the compression and coding processing. As a result, the production price becomes high. For example, in order to compress and code the source data of a movie program of 135 minutes length recorded on a master video tape and record the same as the audio and/or video data on a DVD, at least double the processing time, i.e., 270 minutes (four hours and 30 minutes), is required. Further, working time such as the rewind time of the master video tape becomes necessary in addition to this.

Further, due to the variable rate compression and coding system, the compressing and coding apparatus has to have a compression and coding unit for performing the first compression and coding processing for finding the amounts of data generated at the different parts of the source data preceding the actual compression and coding processing (second compression and coding processing), thus the apparatus becomes complex and the size of the apparatus becomes large.

In the two-path system of the variable rate compression and coding system explained above, the information, which is required in the second time compression and coding processing, on the amounts of data allocated to the different parts of the source data based on the amounts of data of the compressed data obtained by the first compression and coding processing (allocation information) is stored for example in the personal computer (PC) controlling the compression and coding processing.

When the compression and coding of the source data is carried out only one time, it is sufficient to just store the allocation information in the personal computer for controlling the compression and coding processing. However, there is no guarantee that the allocation information will continue to be stored in the personal computer as it is even after the compression and coding, therefore when source data recorded on a master video tape or a work master video tape is repeatedly reproduced for compression and coding many times, there is a possibility that it would become necessary to perform the compression and coding processing by the two path system every time.

DISCLOSURE OF THE INVENTION

The present invention was made so as to overcome the disadvantages of the prior art and has as its object to provide an audio and/or video data recording apparatus, and a method for the same, which can compress and code source data (stock data) with a compression and coding rate in accordance with the recording capacity of the recording medium and thereby effectively utilize the recording capacity of the recording medium and in addition which can make the data after the expansion and decoding high in quality.

Further, still another object of the present invention is to provide an audio and/or video data recording apparatus, and a method of the same, which can estimate the amount of data after compression of the source data by the variable rate compression and coding system during the time when the source data is being copied from the master video tape to the work video tape.

Further, yet another object of the present invention is to provide an audio and/or video data recording apparatus, and a method of the same, which can record the allocation data indicating the amounts of data allocated to the parts of the source data together on the recording medium recording the source data.

Further, another object of the present invention is to provide an audio and/or video data recording apparatus, and a method of the same, which can reproduce the allocation data from the recording medium together with the source data and perform the variable rate compression and coding processing based on the reproduced allocation data.

Further, another object of the present invention is to provide an audio and/or video data recording apparatus, and a method of the same, which does not require the use of a two-path system of the variable rate compression and coding system each time the same data is compressed and coded and which can therefore quickly compress and code the source data.

Further, another object of the present invention is to provide a recording medium such as a video recording tape on which the allocation information is recorded in addition to the source data.

To achieve the above objects, a first audio and/or video data compressing apparatus according to the present invention has an audio and/or video data reproducing means for reproducing audio and/or video data from a first recording medium on which audio data and video data or either of the same (audio and/or video data) are recorded; a first audio and/or video data recording means for recording the audio and/or video data reproduced by the audio and/or video data reproducing means on a second recording medium; an audio and/or video data compressing means for quantizing the supplied audio and/or video data and compressing the same to generate compressed data; and a quantization value calculating means for calculating a quantization value for making an amount of the compressed data a desired amount of data based on an amount of compressed data generated by the quantization and compression of the audio and/or video data, reproduced from the first recording medium by the reproducing means, by the audio and/or video data compressing means by a predetermined quantization value.

Preferably, when compressing the video data, the quantization value calculating means calculates the quantization value for every group of a plurality of frames based on the amount of the compressed data generated by the audio and/or video data compressing means.

Preferably, the audio and/or video data compressing means quantizes the audio and/or video data recorded on the second recording medium based on the quantization value calculated by the quantization value calculating means.

Preferably, the first audio and/or video data recording means records the quantization value calculated by the quantization value calculating means on the second recording medium.

Preferably, there is further provided a second audio and/or video data recording means for recording the compressed data, which is generated by reproducing data from the second recording medium by the audio and/or video data reproducing means and quantizing and compressing the same by the audio and/or video data compressing means, on a third recording medium; and the quantization value calculating means calculates the quantization value so that the amount of the compressed data generated by the audio and/or video data compressing means does not exceed the recording capacity of the third recording medium.

Preferably, the first recording means records the quantization value calculated by the quantization value calculating means recorded in the second recording medium at a position before the position where the compressed data generated by the audio and/or video data compressing means.

The first audio and/or video data recording apparatus according to the present invention makes a copy of the uncompressed and uncoded source data (audio and/or video data) from the master use VTR tape (master video tape: first recording medium) etc. recording the audio and/or video data (source data) such as a program which becomes the material for editing etc. to a standby use VTR tape (work video tape: second recording medium) etc., compresses and codes the data by a variable rate compression and coding system such as the MPEG to generate compressed data of less than the recording capacity of a recording medium such as a magneto-optical disk (MO) or digital video disk (DVD) so that it can be recorded on these recording media, and records the same.

In the audio and/or video data recording apparatus according to the present invention, the audio and/or video data reproducing means reproduces the source data from the master video tape (first recording medium).

The first audio and/or video data recording means records the source data reproduced from the master video tape by the audio and/or video data reproducing means on the work video tape.

The audio and/or video data compressing means compresses and codes the source data reproduced by the audio and/or video data reproducing means by a compression and coding system such as the MPEG2 to generate the compressed data. That is, the audio and/or video data compressing means performs the compression processing of the reproduced source data by discrete cosine transformation (DCT) of the difference between frames in units of groups of pictures (GOPs) containing a plurality of frames, quantizes the same with a fixed quantization value which is set in advance, and codes this by run length limited (RLL) coding etc. to generate compressed data having a variable length during the time that the audio and/or video data reproducing means is reproducing the source data from the master video tape and copying the reproduced source data on the work video tape.

The quantization value calculating means calculates the amount of the compressed data generated by the audio and/or video data compressing means performing the compression processing and quantizing the result by the fixed quantization value in for example units of groups of pictures and calculates a new quantization value giving an amount of the compressed and coded data less than the recording capacity of the DVD etc. and giving the smallest remaining recording capacity based on the amount of this compressed data and the recording capacity of the DVD or the like (third recording medium) during the time when the source data is being copied from the master video tape to the work video tape.

By calculating the quantization value based on the amount of the compressed data obtained by the first compression and coding (first path) in this way and using the optimized quantization value in the second compression and coding (second path), compression and coding enabling recording on a DVD etc. and in addition giving the highest quality of the audio and/or video after the expansion and decoding can be carried out.

Further, since a new quantization value is calculated during the time when the source data is being copied to the work video tape, it is not necessary to reproduce the source data just to calculate the new quantization value and thus the time of the compression and coding processing and recording processing can be shortened by this amount.

The audio and/or video data recording means records the compressed and coded data, which the compressing and coding means generates by compressing and coding the source data reproduced by the recording and reproducing means, by using the new quantization value on a recording medium such as an MO.

Further, the audio and/or video data recording means records the quantization value calculated by the quantization value calculating means on the master video tape or the work video tape so that it can be used whenever compressing and coding the source data so as thereby to make the calculation of the quantization value at times other than the first time unnecessary and to shorten the time required for the compression and coding processing after the first time.

Further, a second audio and/or video data compressing apparatus according to the present invention has an audio and/or video data reproducing means for reproducing audio and/or video data from a first recording medium on which audio data and video data or either of the same (audio and/or video data) are recorded; an audio and/or video data recording means for recording the audio and/or video data reproduced by the audio and/or video data reproducing means on a second recording medium; and an audio and/or video data compressing means for quantizing the supplied audio and/or video data and compressing the same to generate compressed data, wherein the audio and/or video data recording means records data indicating the amount of the compressed data, generated by the audio and/or video data compressing means quantizing the audio and/or video data reproduced from the first recording medium by the reproducing means with a quantization value determined in advance and compressing the same, on the second recording medium.

Further, a third audio and/or video data compressing apparatus according to the present invention has an audio and/or video data reproducing means for reproducing audio and/or video data from a first recording medium on which the audio data and video data or either of them same (audio and/or video data) are recorded; an audio and/or video data recording means for recording the audio and/or video data reproduced by the audio and/or video data reproducing means on a second recording medium; and an audio and/or video data compressing means for quantizing the supplied audio and/or video data and compressing the same to generate compressed data, wherein the audio and/or video data recording means further records data indicating the amount of the compressed data, which the audio and/or video data compressing means generates by quantizing the audio and/or video data reproduced from the first recording medium by the reproducing means with a quantization value determined in advance and compressing the same, on a third recording medium.

Further, a fourth audio and/or video data compressing apparatus according to the present invention has a first audio and/or video data compressing means for reproducing audio and/or video data from a first recording medium on which the audio data and video data or either of the same (audio and/or video data) are recorded and quantizing and compressing the same to thereby generate compressed data; a compressed data amount calculating means for calculating an amount of compressed data indicating the data after the compression of the audio and/or video data based on the amount of the compressed data generated by the audio and/or video data compressing means; and a recording means for recording the amount of compressed data calculated by the compressed data amount calculating means on the first recording medium.

Preferably, the recording means records the amount of compressed data calculated by the compressed data amount calculating means in the first recording medium at a position before the position where the audio and/or video data is recorded.

Preferably, there is further provided a second audio and/or video data compressing means for reproducing the amount of the compressed data and the audio and/or video data recorded on the first recording medium by the recording means and quantizing and compressing the reproduced the audio and/or video data based on reproduced amount of compressed data.

Preferably, the recording means records a quantization value used for quantization in the second audio and/or video data compressing means on the first recording medium as the amount of compressed data.

Further, a fifth audio and/or video data compressing apparatus according to the present invention has an audio and/or video data compressing means for reproducing audio and/or video data from a first recording medium on which the audio data and video data or either of the same (audio and/or video data) are recorded and quantizing and compressing the same to thereby generate compressed data and a recording means for recording an amount of compressed data indicating the amount of the compressed data generated by the audio and/or video data compressing means on the first recording medium.

Preferably, the recording means records the amount of compressed data calculated by a compressed data amount calculating means in the first recording medium at a position before the position where the audio and/or video data is recorded.

Further, a first audio and/or video data compressing method according to the present invention comprises reproducing audio and/or video data from a first recording medium on which the audio data and video data or either of the same (audio and/or video data) are recorded; recording the reproduced audio and/or video data on a second recording medium; and calculating a quantization value for making the compressed data have a desired amount of data based on the amount of the compressed data generated by quantizing the audio and/or video data reproduced from the first recording medium with a quantization value determined in advance and compressing the same.

Further, a second audio and/or video data compressing method according to the present invention comprises reproducing audio and/or video data from a first recording medium on which the audio data and video data or either of the same (audio and/or video data) are recorded; recording the reproduced audio and/or video data on a second recording medium; and recording data indicating the amount of the compressed data generated by quantizing the audio and/or video data reproduced from the first recording medium with a quantization value determined in advance and compressing the same on the second recording medium.

Further, a third audio and/or video data compressing method according to the present invention comprises reproducing audio and/or video data from a first recording medium on which the audio data and video data or either of the same (audio and/or video data) are recorded; recording the reproduced audio and/or video data on a second recording medium; and further recording data indicating the amount of the compressed data generated by quantizing the audio and/or video data reproduced from the first recording medium with a quantization value determined in advance and compressing the same on a third recording medium.

Further, a fourth audio and/or video data compressing method according to the present invention comprises reproducing audio and/or video data from a first recording medium on which the audio data and video data or either of the same (audio and/or video data) are recorded; quantizing and compressing the same to generate compressed data; calculating an amount of compressed data indicating the data after the compression of the audio and/or video data based on the amount of the generated compressed data; and recording the calculated amount of compressed data on the first recording medium.

Further, a fifth audio and/or video data compressing method according to the present invention comprises reproducing audio and/or video data from a first recording medium on which the audio data and video data or either of the same (audio and/or video data) are recorded; quantizing and compressing the same to generate compressed data; and recording an amount of compressed data indicating the amount of the generated compressed data on the first recording medium.

BRIEF DESCRIPTION OF THE DRAWINGS

The above and other objects and features of the present invention will be more apparent from the following description given with reference to the accompanying drawings, in which.

BEST MODE FOR CARRYING OUT THE INVENTION

First Embodiment

Below, an explanation will be made of a first embodiment of the present invention.

Figure 1:
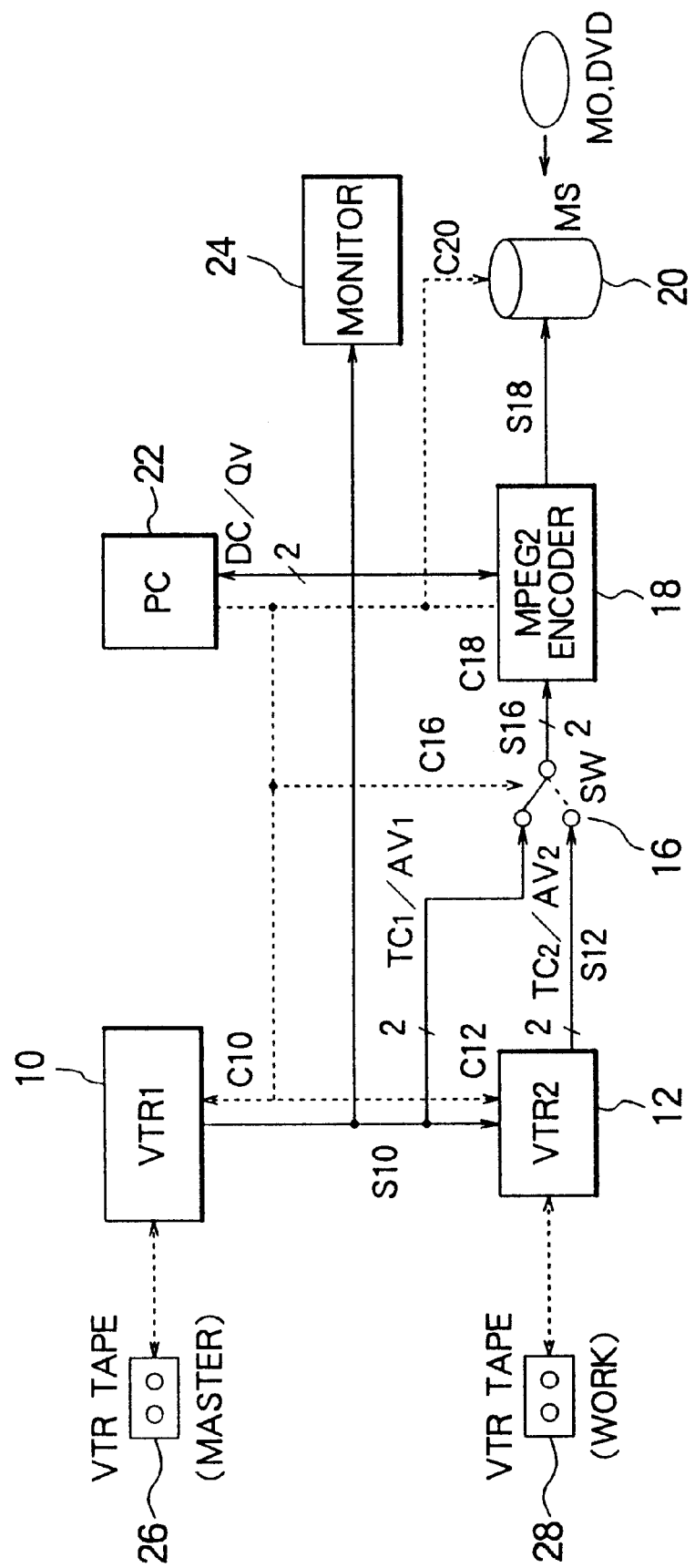
FIG. 1 is a view of the configuration of an audio and/or video data compressing apparatus of an embodiment according to the present invention.

FIG. 1 is a view of the configuration of an audio and/or video data compressing apparatus 1 according to the present invention.

As shown in FIG. 1, the audio and/or video data compressing apparatus 1 is constituted by a first VTR apparatus 10, a second VTR apparatus 12, a switch circuit (SW) 16, an encoder 18 for MPEG2, a magneto-optical disk recording device (MS) 20, a control device (PC) 22, and a monitor device 24.

The audio and/or video data compressing apparatus 1 copies audio data and video data or either of the same (audio and/or video data: source data) such as a program to be edited, which are recorded on a master use VTR tape (master video tape: first recording medium) 26, on a stand-by use VTR tape (work video tape: second recording medium) 28 by these constituent parts and, at the same time, compresses and codes the same by for example the MPEG2 system and records the compressed data on a magneto-optical disk (MO) or digital video disk (DVD: third recording medium) mounted in the recording apparatus 20.

The control device 22 is for example a personal computer and controls the parts of the audio and/or video data compressing apparatus 1 via control signals C10, C12, C16, C18, and C20 in accordance with the operation data input by the operator of the audio and/or video data compressing apparatus 1.

Further, the control device 22 calculates the amount of data DC of the units of groups of pictures (GOP) of the compressed data which are input from the encoder 18 in the case where the encoder 18 compresses and codes the source data with the quantization value $Q_f$ of a fixed value set in advance and cumulatively adds the amounts of data calculated in the units of GOPs to calculate the amount of data DM of the compressed data as a whole.

Further, the control device 22 compresses and codes for example the source data based on the amount of the calculated entire compressed data, calculates the quantization value $Q_v$ which can be recorded in the recording capacity SC of the magneto-optical disk mounted on the recording apparatus 20 and with which the remaining capacity of the magneto-optical disk becomes the smallest, and outputs the same to the encoder 18. Note that, the control device 22 calculates the quantization value $Q_v$ by referring to a ROM table storing for example the amount of data DM and the recording capacity SC in correspondence in advance or according to the following equation:

$$Q_v = [Q_f(DM/SC)] + 1 \text{ when } Q_f(DM/SC) \text{ is not an integer;}$$

$$Q_v = Q_f(DM/SC) \text{ when } Q_f(DM/SC) \text{ is an integer} \quad (2)$$

where, $Q_v$ indicates a new quantization value;

$Q_f$ indicates a quantization value of a fixed value;

DM indicates the amount of the entire compressed data when the source data is compressed and coded by using the quantization value $Q_f$;

SC indicates a recording capacity of the recording medium on which the recording apparatus 20 records the compressed data; and

[x] indicates an integer not exceeding x.

The VTR apparatus 10 reproduces the source data S10 from the master video tape 26 under the control of the control device 22 via the control signal C10 and outputs the data to the VTR apparatus 12, the monitor device 24, and the master video tape 26. Note that, the source data S10 includes a time code $TC_1$ indicating the borders etc. of the GOPs of the source data and the main body of the audio and/or video data (audio and/or video data $AV_1$).

The VTR apparatus 12 records the source data S10 input from the VTR apparatus 10 on the work video tape 28 under the control of the control device 22 via the control signal C12.

Further, the VTR apparatus 12 reproduces the source data recorded on the work video tape under the control of the control device 22 and outputs the same as the source data S12 to the switch circuit 16. Note that, the source data S12, similar to the source data S10, includes a time code $TC_2$ indicating the borders etc. of the GOPs of the source data and the main body of the audio and/or video data (audio and/or video data $AV_2$).

The switch circuit 16 selects the source data S10 when the VTR apparatus 10 is reproducing the source data under the control of the control device 22 via the control signal C16 and outputs the same to the encoder 18.

Further, the switch circuit 16 selects the source data S12 when the VTR apparatus 12 is reproducing the source data under the control of the control device 22 and outputs the same to the encoder 18.

The monitor device 24 displays the source data S10 reproduced by the VTR apparatus 10 and supplies this for the purpose of the confirmation of the content of the source data S10 by the operator of the audio and/or video data compressing apparatus 1.

Figure 2:
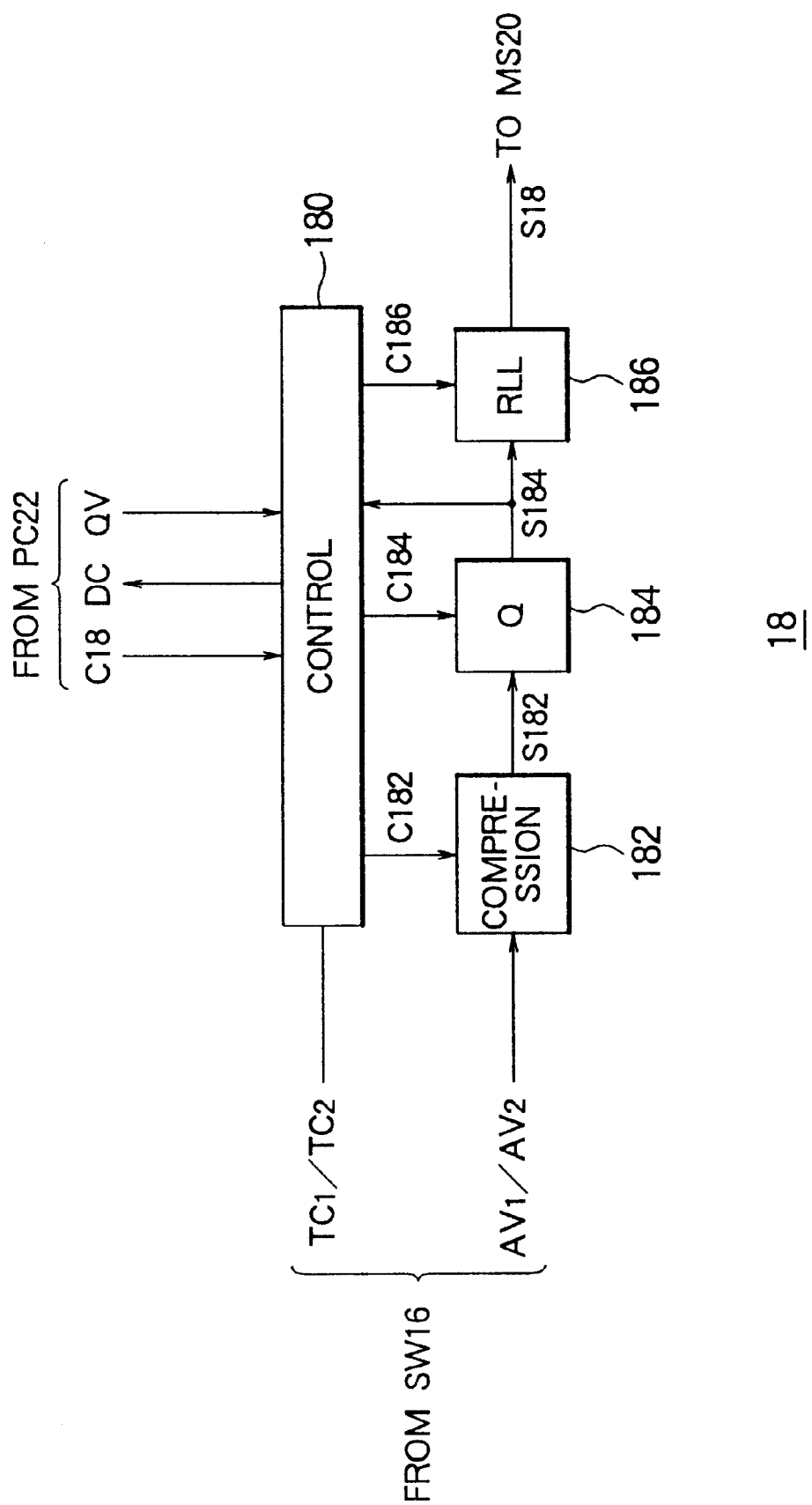
FIG. 2 is a view of the configuration of an encoder shown in FIG. 1.

FIG. 2 is a view of the configuration of the encoder 18 shown in FIG. 1.

As shown in FIG. 2, the encoder 18 is constituted by a control circuit 180, a compression circuit 182, a quantization circuit (Q) 184, and a run length limited coding circuit (RLL coding circuit) 186.

The encoder 18 compresses and codes the source data S10 and S12 by for example the MPEG2 system by using the quantization value $Q_f$ of the fixed value set in advance or the quantization value $Q_v$ input from the control device 22 under the control of the control device 22 via the control signal C18 by these constituent parts.

The control circuit 180 controls the constituent parts of the encoder 18 via the control signals C182, C184, and C186 according to the control signal C18 input from the control device 22.

Further, the control circuit 180 calculates the amount of data DC of the quantization signal S184, obtained by compression and quantization of the audio and/or video data $AV_1$ of the source data S10 input from the VTR apparatus 10 via the switch circuit 16 by the compression circuit 182 and the quantization circuit 184 using the quantization value $Q_f$, by using the time code $TC_1$ in units of GOPs and outputs the same to the control device 22.

Further, the control circuit 180 sets a new quantization value $Q_v$ input from the control device 22 in the quantization circuit 184 via the control signal C184.

The compression circuit 182 is constituted by a difference calculation circuit for calculating the difference between frames, a DCT circuit for performing DCT for audio and/or video data $AV_1$ and $AV_2$, and so on.

By these constituent parts, the compression circuit 182 compresses the audio and/or video data in units of GOPs under the control of the control circuit 180 via the control signal C182 and outputs the same as the compressed data S182 to the quantization circuit 184.

The quantization circuit 184 quantizes the compressed data S182 generated from the audio and/or video data $AV_1$ of the source data S10 (=S16) for every quantization value $Q_f$ under the control of the control circuit 180 and outputs the same as the quantization signal S184 to the RLL coding circuit 186.

The RLL coding circuit 186 codes the quantization signal S184 by for example the RLL (1,7) coding system under the control of the control circuit 180 via the control signal C186 and outputs the same as the compressed and coded signal S18 to the recording apparatus 20.

The recording apparatus 20 (FIG. 1) records the compressed data S18 generated from the source data S12 by the encoder 18 on a magneto-optical disk or DVD under the control of the control circuit 180 via the control signal C20.

Below, the operation of the audio and/or video data compressing apparatus 1 will be explained by referring to FIG. 1 and FIG. 4.

The operator of the audio and/or video data compressing apparatus 1 loads the master video tape 26 in the VTR apparatus 10 and operates the control device 22 to input the operation data for making the VTR apparatus 10 reproduce the source data S10 (time code $TC_1$ and audio and/or video data $AV_1$) and making the VTR apparatus 12 copy the same and, at the same time, compress and code this and recording the same in the control device 22.

First, the control device 22, according to the input operation data, controls the switch circuit 16 to make it select the source data S10, controls the VTR apparatus 10 to make it start the reproduction of the source data from the master video tape 26, and controls the VTR apparatus 12 to make it start the recording of the source data S10 and make the encoder 18 start the compression and coding.

The encoder 18 compresses and codes the input source data S10 (S16) in parallel by using the fixed quantization value $Q_f$ and sequentially outputs the amounts of data DC in units of GOPs to the control device 22 during the time when the VTR apparatus 12 is recording the source data S10 on the work video tape 28.

The control device 22 sequentially cumulatively adds the amounts of data DC input from the encoder 18 to calculate the amount of data DM of the entire compressed data obtained by compressing and coding the entire source data S10 (S16) by using the quantization value $Q_f$ when the VTR apparatus 10 terminates the reproduction of the source data S10. Further, the control device 22 calculates a new quantization value $Q_v$ based on the amount of data DM as shown in for example Equation 2 and outputs the same to the control circuit 180 of the encoder 18.

The control circuit 180 of the encoder 18 sets the new quantization value $Q_v$ input from the control device 22 in the quantization circuit 184.

Further, the control device 22 controls the switch circuit 16 to make it select the source data S12 and controls the VTR apparatus 12 to make it start the reproduction of the source data S12 recorded on the work video tape 28.

Further, the control device 22 controls the encoder 18 to make it start the compression and coding with respect to the source data S12 (S16) using the quantization value $Q_v$ and makes the recording apparatus 20 start the recording of the compressed and coded signal S18.

The encoder 18 sequentially compresses and codes the source data S12 reproduced by the VTR apparatus 12 to generate the compressed data S18.

The recording apparatus 20 sequentially records the compressed data S18 input from the encoder 18 on the magneto-optical disk.

Note that, the audio and/or video data compressing apparatus 1 according to the present invention can be widely utilized for the purpose of making a copy of the data, estimating the amount of data after the compression and coding, and compressing and coding and recording the same.

Further, the data to be recorded on the recording apparatus 20 by the audio and/or video data compressing apparatus 1 is not limited to the audio and/or video data. Accordingly, the audio and/or video data compressing apparatus 1 can be applied to all data suited to the audio and/or video data compressing apparatus 1, for example, only video data or only audio data.

Further, in the encoder 18, it is also possible to constitute the moving picture coding apparatus so that the compression rate is changed by changing a variable other than the quantization value of the quantization circuit 184.

Further, it is also possible to constitute the same so that the edit master tape copying the source data is reproduced by the first VTR apparatus 10 and the compression and coding are carried out by the encoder 18.

Further, it is also possible to replace the recording apparatus 20 for the magneto-optical disk by a recording apparatus for a hard disk and replace the VTR apparatuses 10 and 12 by for example recording apparatuses for hard disks or magneto-optical disks.

Further, it is also possible to constitute the audio and/or video data compressing apparatus 1 so that in the encoder 18 the compression rate is changed by changing a variable other than the quantization value of the quantization circuit 184.

Further, even if the audio and/or video data compressing apparatus 1 is constituted so that the work video tape 28 copying the source data is reproduced from by the VTR apparatus 10 and its data is compressed and coded by the encoder 18, this is contained in the technical scope of the present invention.

Further, it does not matter whether the constituent parts of the audio and/or video data compressing apparatus 1 are constituted by hardware or constituted by software so far as the same functions and performances can be realized.

Further, while the encoder 18 of the audio and/or video data compressing apparatus 1 shown as the first embodiment performed the compression and coding of the video data by the MPEG system, it is also possible to modify the encoder 18 so as to perform the compression and coding of the video data by other compression and coding systems.

Conventionally, the operation of making a copy of the audio and/or video data, estimating the amount of data after the compression and coding, and then performing the compression, coding, and recording had to be carried out by the so-called "two way" method of repeatedly reproducing the source data three times at each of the copying of the data from the master video tape 26 to the work video tape 28, the estimation of the amount of data, and the compression, coding, and recording. Contrary to this, as explained above, the audio and/or video data compressing apparatus 1 according to the present invention appears to reproduce the source data only two times and can perform the operation one way. Accordingly, according to the audio and/or video data compressing apparatus 1, the working efficiency is improved.

Further, the constituent parts of the audio and/or video data compressing apparatus 1 are indispensable constituent parts also in a conventional audio and/or video data compressing apparatus performing a similar operation, so the size of the apparatus is not increased much at all in comparison with a conventional apparatus.

As mentioned above, according to the first embodiment of the present invention, the source data is compressed and coded with a compression rate in accordance with the recording capacity of the recording medium after the compression and coding of the source data and the recording capacity of the recording medium is effectively utilized, thus the data after the expansion and decoding can be raised in quality.

Further, according to the first embodiment of the present invention, the amount of data after compressing the source data by the variable rate compression and coding system can be estimated during the time when the source data is being copied from the master video tape to the work video tape.

Second Embodiment

Below, a second embodiment of the present invention will be explained by referring to FIG. 3 to FIG. 8 while taking as an example the compression and coding of video data.

An audio and/or video data compressing apparatus 2 explained in the second embodiment compresses and codes for example the uncompressed video data of a moving picture by a variable rate compression and coding system according to the MPEG2 and records the same on a digital video disk (DVD) similar to the audio and/or video data compressing apparatus 1 (FIG. 1) shown in the first embodiment.

Figure 3:
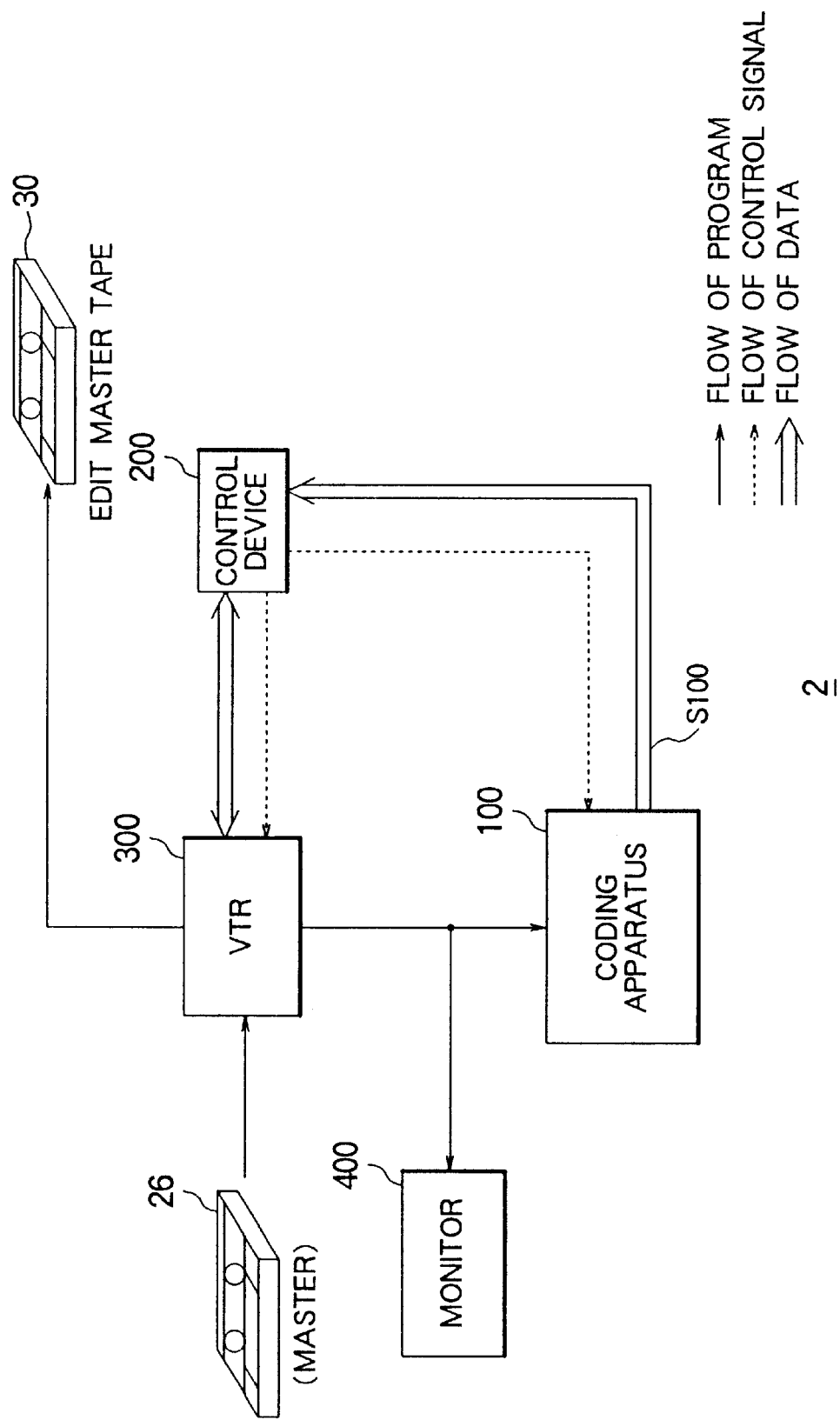
FIG. 3 is a view of the configuration of an audio and/or video data compressing apparatus of a second embodiment according to the present invention.

FIG. 3 is a view of the configuration of the audio and/or video data compressing apparatus 2 according to the present invention in the second embodiment.

Uncompressed video data (source data) of for example a movie program is recorded on a master video tape 26 similar to in the audio and/or video data compressing apparatus 1 shown in FIG. 1 in the first embodiment.

The video data compressing apparatus 2 has a video tape recording and reproduction apparatus (VTR) 300 for mounting the master video tape 26 and reading and reproducing the video data, a monitor TV 400 for displaying the video data reproduced by the VTR 300, a compressing and coding apparatus 100 performing the compression and coding processing by the MPEG2, and a control device 200 which performs the overall control for controlling the VTR 300 and the compressing and coding apparatus 100 to perform the desired compression and coding processing.

The edit master tape 30 has recorded on it the results obtained by the first compression and coding processing mentioned later (compressed data and allocation data).

Figure 4:
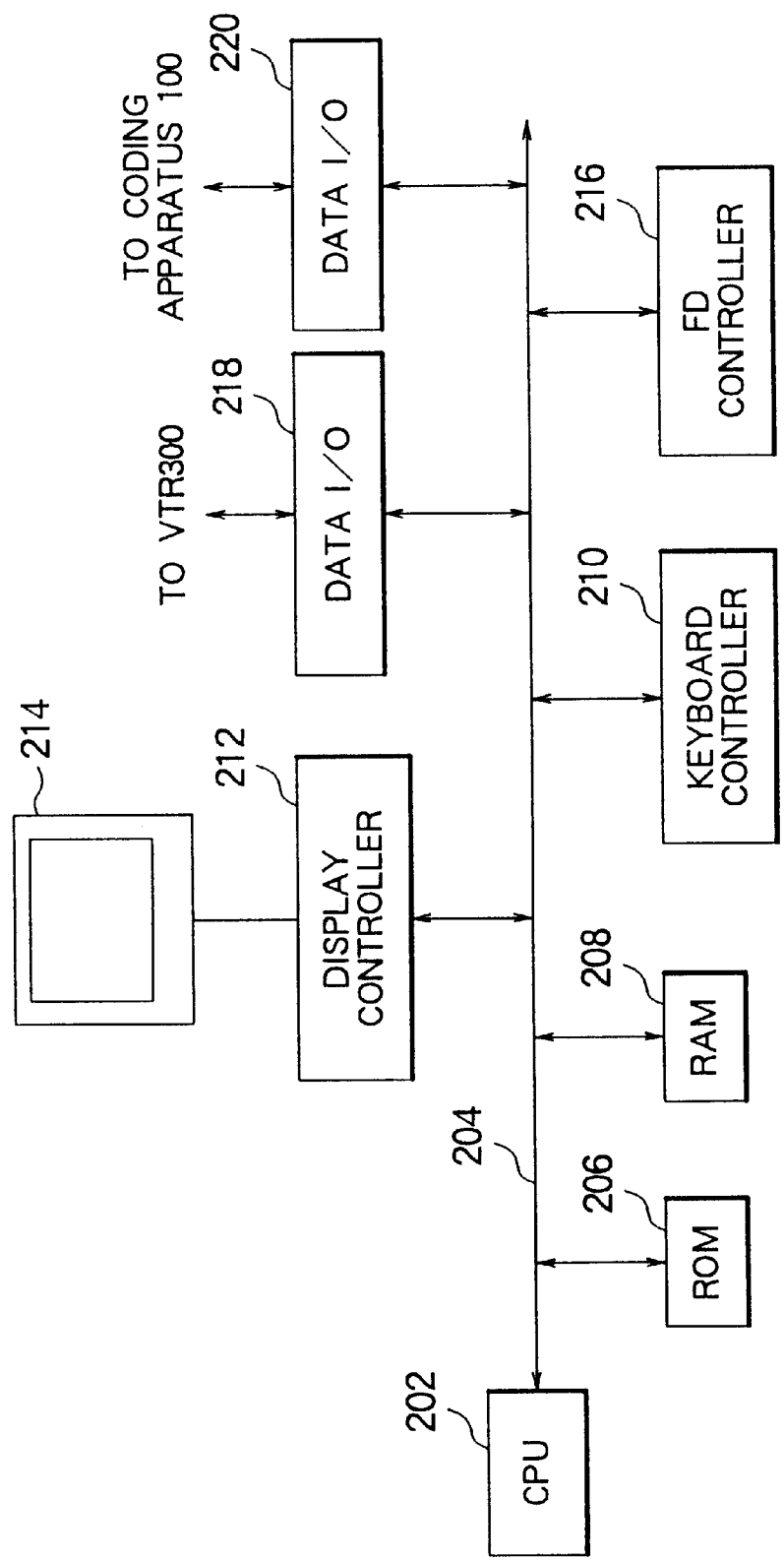
FIG. 4 is a view of the configuration of a control device of the audio and/or video data compressing apparatus shown in FIG. 3.

FIG. 4 is a view of the configuration of the control device 200 of the audio and/or video data compressing apparatus 2 shown in FIG. 3.

The control device 200 is constituted by using for example a personal computer (PC) in the second embodiment.

The control device 200 has a CPU 202 serving as the body of the personal computer (PC), a bus 204, a ROM 206 in which the processing programs mentioned later are stored a RAM 208 for temporarily storing the data, a keyboard controller 210, a display controller 212, a display device 214, a floppy disk (FD) controller 216, a data input/output (I/O) unit 218 connected to the VTR 300, and a data input/output (I/O) unit 220 connected to the compressing and coding apparatus 100.

The data input/output (I/O) unit 218 is an interface used when the CPU 202 controls the operation of the VTR 300 based on a control processing program stored in the ROM 206 or a floppy disk mounted in the floppy disk (FD) controller 214.

The data input/output (I/O) unit 220 is an interface used when the CPU 202 controls the operation of the compressing and coding apparatus 100 based on a control processing program stored in the ROM 206 or a floppy disk mounted in the floppy disk (FD) controller 214.

The keyboard controller 210, the display controller 212, and the display device 214 are used for the interactive operation (dialog) with the operator. That is, these constituent parts are used for the instructions for the start, interruption, or termination of the compression and coding processing by the operator and the display of the information obtained by the compression and coding processing on the display device 214. Note that, the display device 214 used for the above control operation is different from the monitor TV 400 for displaying the video data recorded on the master video tape 26. Further, the FD mounted in the floppy disk (FD) controller 216 is used also for temporarily storing the data indicating the compression and coding results mentioned later.

Figure 5:
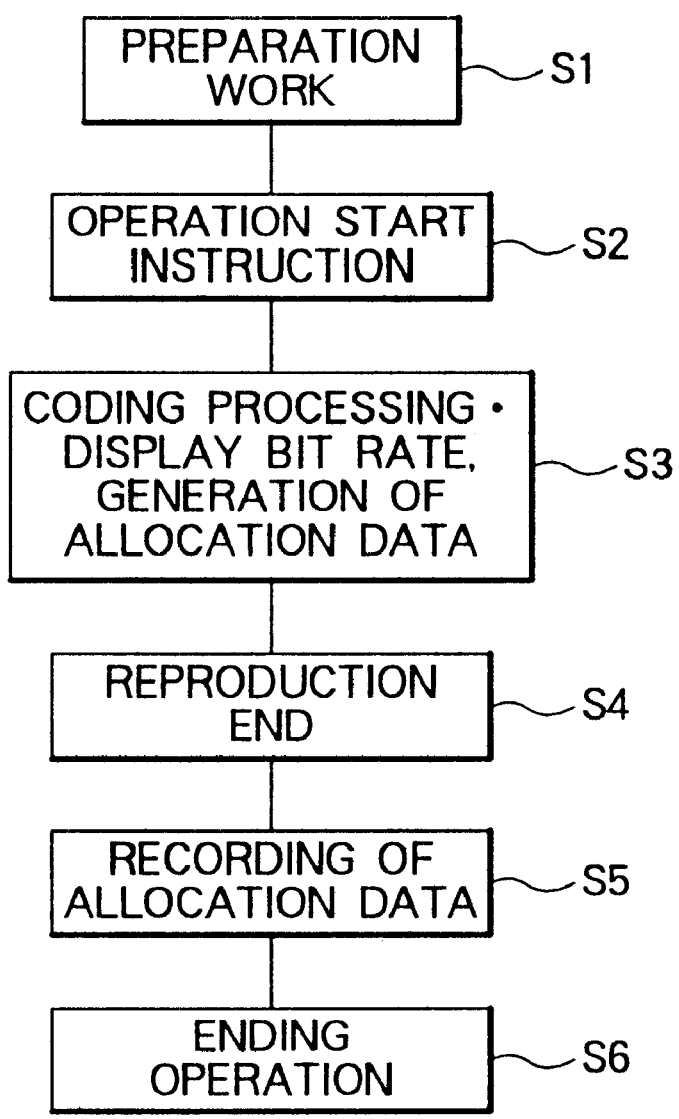
FIG. 5 is a flowchart showing the schematic operation of the video data compressing apparatus shown in FIG. 3.

FIG. 5 is a flowchart showing the schematic operation of the video data compressing apparatus 2 shown in FIG. 3.

Step 1 (S1): Preparatory work

The operator turns on the power of the monitor TV 400, VTR 300, control device 200, compressing and coding apparatus 100, etc. to place them in the operation ready state. Then, the operator loads the master video tape 26 in the VTR 300 and rewinds the master video tape 26 to its initial state.

Step 2 (S2): Operation start instruction

The operator instructs the start of the first compression and coding processing by dialog by using the keyboard controller 210 in the control device 200 and the display device 214.

Step 3 (S3): Coding, display, and generation of allocation data

When there is an instruction for the first compression and coding processing, the CPU 202 of the control device 200 controls the VTR 300 via the data input/output (I/O) unit 218 to make it perform a reproduction operation. Further, the control device 200 controls the compressing and coding apparatus 100 via the data input/output (I/O) unit 22 to brings it to the operation ready state.

Under the control of the control device 200, the VTR 300 starts the reproduction operation, continuously reproduces the video data recorded on the master video tape 26, and outputs the same to the monitor TV 400. The monitor TV 400 displays the reproduced picture of the video data input from the VTR 300 to the operator.

The operator decides by the naked eye whether or not the correct video data is being reproduced by the reproduced picture displayed on the monitor TV 400. The VTR 300 outputs the reproduced video data to the monitor TV 400 and, at the same time, inputs the same also with respect to the compressing and coding apparatus 100.

The compressing and coding apparatus 100 compresses the video data input from the VTR 300 by DCT processing etc. similar to the encoder 18 of the audio and/or video data compressing apparatus 1 (FIG. 1) to generate the compressed data. Note that, a concrete example of the compressing and coding apparatus 100 will be explained later.

The compressing and coding apparatus 100 finds the amount of data (amount of bits generated) and picture type allocation data for every frame of the compressed data, and the control device 200 stores the results in the loaded FD (not illustrated). Note that, the control device 200 can store not only the bit rate data and allocation data, but also various information obtained in the stage of coding, for example, the frame information of a scene change, in the FD.

Figure 6:
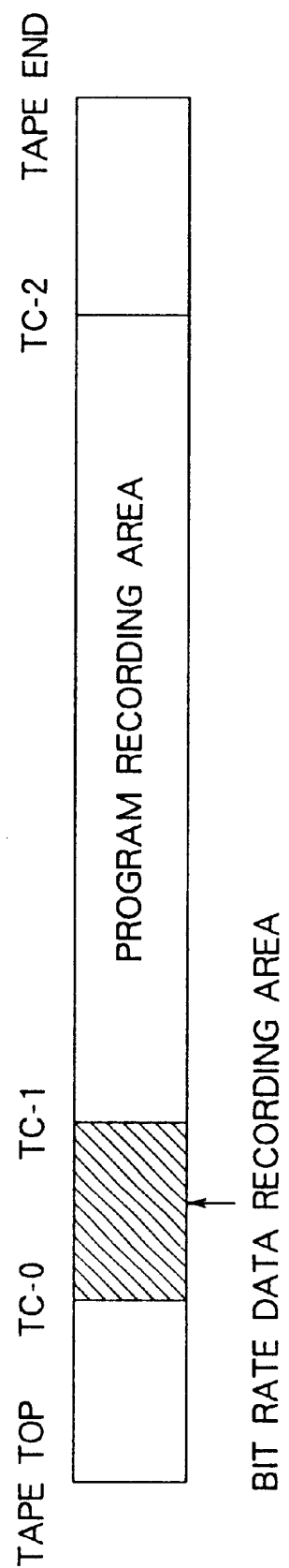
FIG. 6 is a view of a recording region of a master video tape (FIG. 3)

FIG. 6 is a view of the recording region of the master video tape 26 (FIG. 3).

The video data is recorded within the range of the master video tape 26 from the time code TC1 to the time code TC2 indicating the end of the program and is reproduced by the VTR 300. Note that, during this continuous reproduction operation, the operator watches the monitor TV 400 to confirm that there is no problem in the reproduced display content. If the quality of the picture displayed on the monitor TV 400 is poor etc., the operator can interrupt the reproduction operation mentioned above via the keyboard controller 210. In certain cases, it is also possible for the operator to skip a part which will not be used so as to delete the reproduction data of the corresponding part.

Step 4 (S4): Termination of reproduction

Refer to FIG. 5 again. When the reproduction is carried out in the VTR 300 up to the end of the video data recorded on the master video tape 26, an end signal is transmitted from the VTR 300 to the control device 200. This state is displayed on the display device 214. By this, the operator learns of the end of the reproduction.

When the operator who has been monitoring the display content of the monitor TV 400 confirms that there is no problem in the display content, he can understand that the reproduction operation was correctly carried out.

The operator instructs the rewind of the master video tape 26 via the keyboard controller 210. The CPU 202 of the control device 200 instructs the rewinding of the master video tape 26 to the VTR 300 through the data input/output (I/O) unit 218. The VTR 300 rewinds the master video tape 26. Note that, it is also possible for the control device 200 to automatically instruct the rewinding of the master video tape 26 to the VTR 300 when the end signal is received from the VTR 300.

Step 5 (S5): Recording of bit rate data

When the rewinding is ended, the VTR 300 outputs information indicating the end of rewinding to the control device 200. The CPU 202 of the control device 200 records the bit rate data of every frame recorded on the FD in the control device 200 in the header position of the rewound master video tape 26 through the data input/output (I/O) unit 218.

In the audio and/or video data compressing apparatus 2 shown as the second embodiment, as shown in FIG. 6, the amount of data for every frame of the compressed data (bit rate data: allocation data) is recorded in a range from the time code TC0 to the time code TC1. In other words, in the audio and/or video data compressing apparatus 2, as shown in FIG. 6, a spare region (bit rate data recording area) for recording the bit rate data for every frame is provided on the master video tape 26 in the range from TC0 to TC1.

For example, in the case of a movie program of 135 minutes duration, the bit rate data is about 400 KB. In the case of a digital VTR, this just corresponds to a digital amount of about one second of reproduction time of the master video tape 26. Note that, as the track for recording the bit rate data, it is possible to either use the video track or use the audio track.

Note that, in the spare region of TC0 to TC1, not only the bit rate data for every frame mentioned above, but also various information which is obtained at the stage of compression and coding in the processing of for example step 3 (FIG. 5) and stored in the FD can be stored.

Step 6 (S6): Ending operation

The control device 200 writes the bit rate data in the spare region of TC0 to TC1 of the master video tape 26 and then controls the VTR 300 to make it rewind the master video tape 26 up to the tape top (TC0 shown in FIG. 6).

As described above, the master video tape 26 on which the bit rate data is recorded in the spare region of TC0 to TC1 in addition to the source data (video data) recorded in the range of from TC1 to TC2 will be referred to as an edit master video tape 30 since it is utilized for editing.

Figure 7:
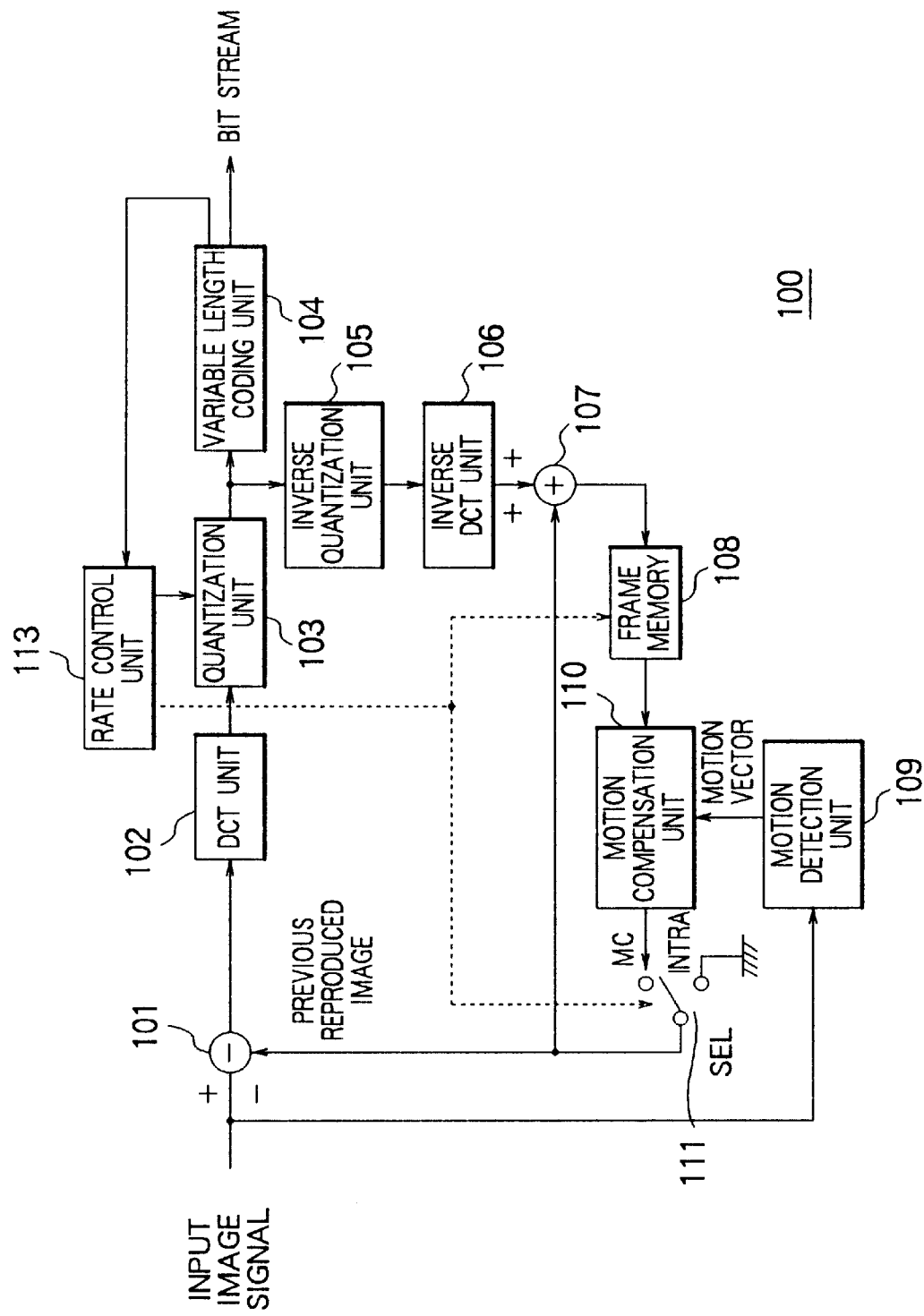
FIG. 7 is a view of an example of the configuration of the compressing and coding apparatus shown in FIG. 3.

FIG. 7 is an example of the configuration of the compressing and coding apparatus 100 shown in FIG. 3.

The compressing and coding apparatus 100 calculates the amount of data (bit rate) etc. for every frame after the compression and coding of the video data reproduced from the master video tape 26 according to the rules of the MPEG2.

The compressing and coding apparatus 100 has a subtraction unit 101, a DCT unit 102, a quantization unit 103, a variable length coding unit 104, an inverse quantization unit 105, an inverse DCT unit 106, an adder 107, a frame memory 108, a motion detection unit 109, a motion compensation unit 110, a switching circuit 111, and a rate control unit 113.

The difference of the video data which is reproduced at the VTR 300 and input to the compressing and coding apparatus 100 from the input from the switching circuit 111 is found at the subtraction unit 101, and the difference is output to the DCT unit 102. At the time of an intra-picture mode, meaningful video data is not input from the switching circuit 111, therefore the video data input to the adder 101 is output to the DCT unit 102 as it is. In the motion compensation prediction mode, the video data based on the reproduced picture before this is input from the switching circuit 111, therefore the difference thereof is found at the adder 101 and the difference is output to the DCT unit 102.

The DCT unit 102 performs discrete cosine transformation (DCT), which is one type of orthogonal transformation, on the video data input from the adder 101 and outputs the obtained result of transformation to the quantization unit 103.

The quantization unit 103 quantizes the result of transformation input from the DCT unit 102 by a predetermined quantization value input from the rate control unit 113 and outputs the result to the variable length coding unit 104 and the inverse quantization unit 105.

The variable length coding unit 104 performs variable length coding on the quantized transformation result to generate the compressed data (video bit stream) and outputs the amount of data for every frame of the compressed data to the rate control unit 113.

The rate control unit 113 instructs the quantization rate to the quantization unit 103, records the video data in the frame memory 108 mentioned later, switches the switching circuit 111, controls the parts constituting the compressing and coding apparatus 100, etc.

The result of transformation quantized at the quantization unit 103 is inversely quantized at the inverse quantization unit 105 and further subjected to the inverse discrete cosine transformation (inverse DCT) processing at the inverse DCT unit 106. In the mode for performing the motion compensation prediction, the inverse DCT-processed video data and the video data obtained by the motion compensation prediction are added at the adder 107 to restore the original video data which is then recorded in the frame memory 108. In the intra-picture mode, the video data subjected to the inverse DCT at the inverse DCT unit 106 is recorded as it is in the frame memory 108.

When motion compensation prediction is carried out, the motion detection unit 109 uses the video data recorded in the frame memory 108. That is, the motion detection unit 109 performs the motion detection of the next frame of the input video data and detects the motion vector based on the video data recorded in the frame memory 108.

Further, the motion compensation unit 110 performs motion compensation prediction based on the motion vector detected by the motion detection unit 109 and outputs the video data obtained by the motion compensation prediction to the adder 101 via the switching circuit 111. The adder 101 finds the difference of the same from the input video data of the input next frame.

Figure 8:
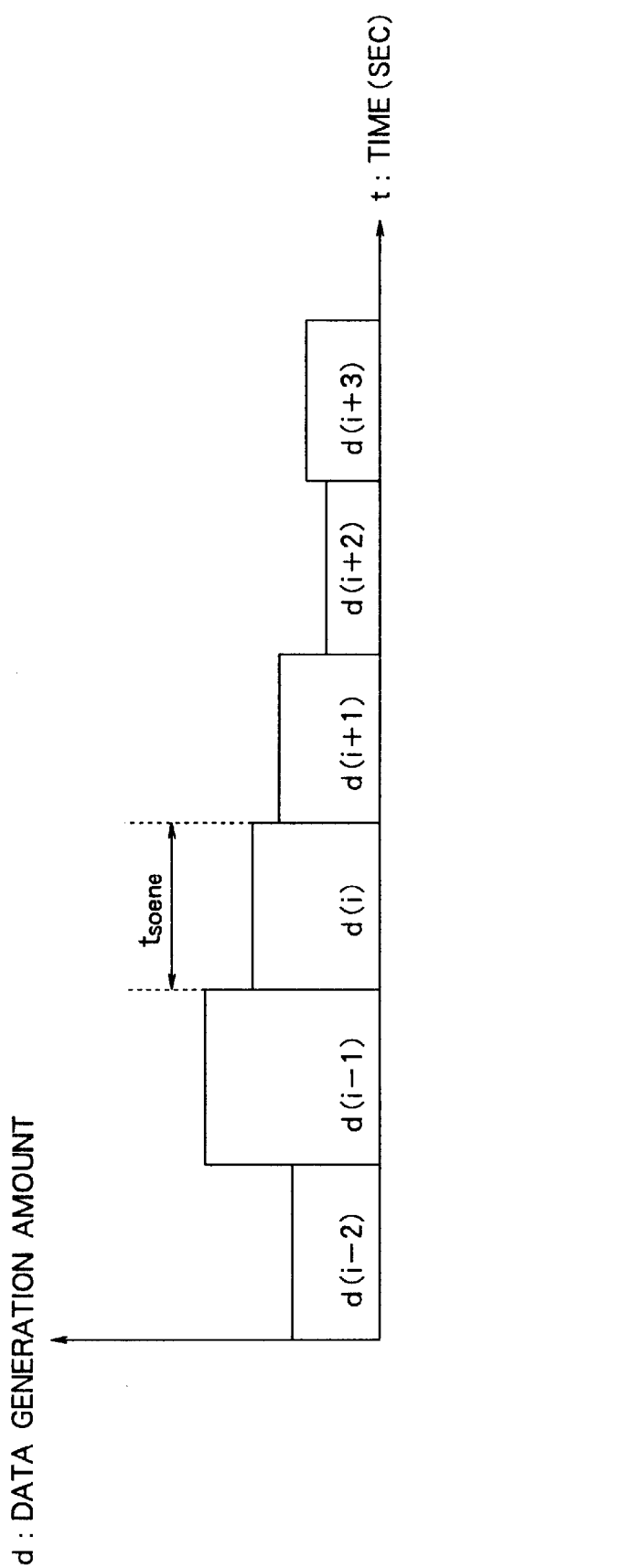
FIG. 8 is a view illustrating the value of the bit rate data (allocation data) for every frame obtained by the operation of the compressing and coding apparatus shown in FIG. 7.

FIG. 8 shows an example where the value of the bit rate data (allocation data) for every frame obtained by the operation of the compressing and coding apparatus 100 shown in FIG. 7 mentioned above is illustrated and shows a bit rate data of a period i [generated amount of data d(i)].

In the FD loaded in the floppy disk (FD) controller 216 of the control device 200, the amount of data (amount of generated data) of the video data coded at the compressing and coding apparatus 100 and further the bit rate data (allocation data) shown in FIG. 8 are recorded.

Next, a description will be made of the second compression and coding processing.

Figure 9:
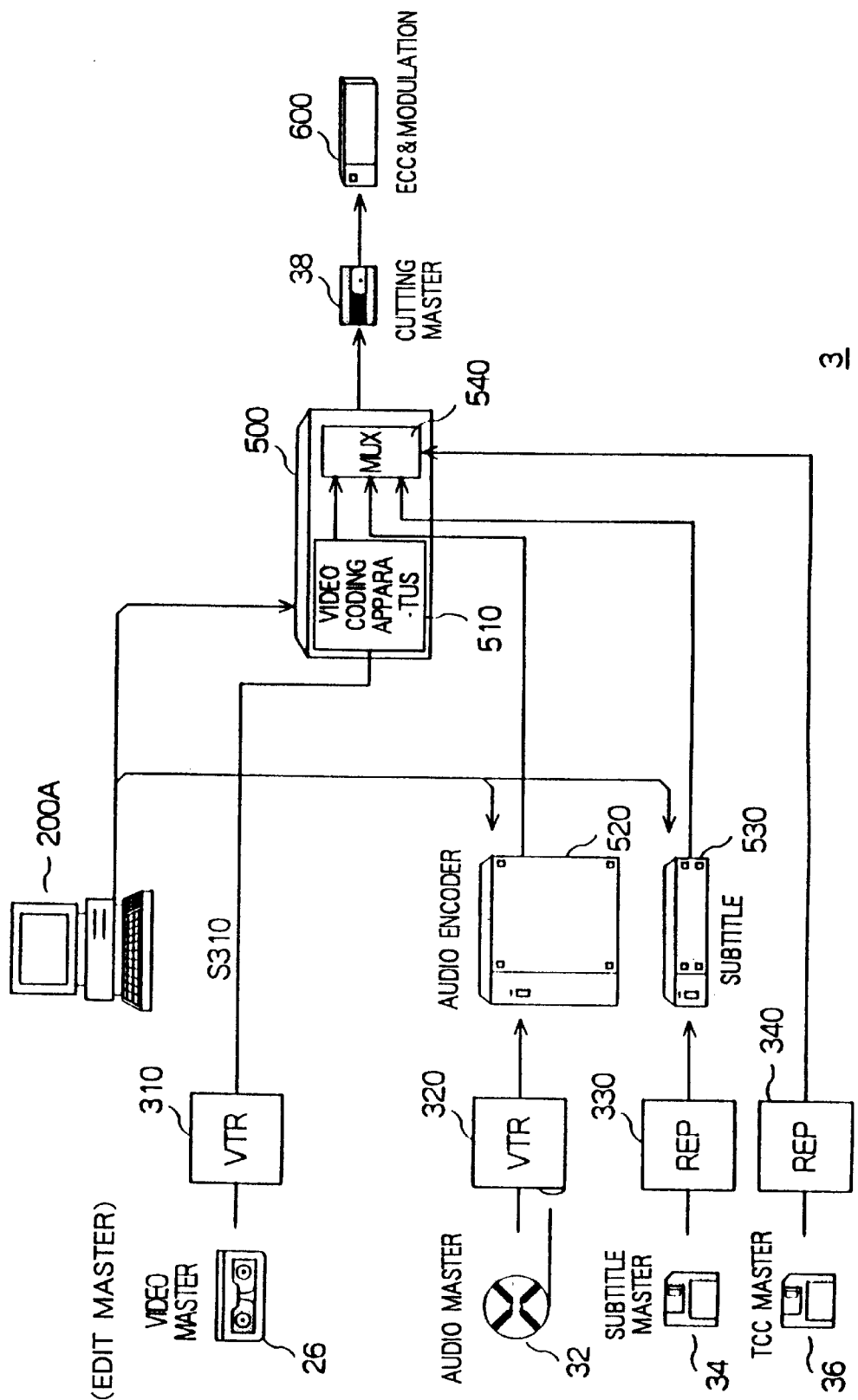
FIG. 9 is a view of the configuration of an authoring apparatus of the embodiment according to the present invention.

FIG. 9 is a view of the configuration of an authoring apparatus 3 of the embodiment of the present invention.

The authoring apparatus 3 has a first VTR 310 for reproducing the data recorded on the master video tape 26 (edit master video tape 30) mentioned above, a second VTR 320 for reproducing the audio data from an audio master 32 independently recording the audio data from the video data, a subtitle reproduction apparatus 330 for reading the subtitles of a movie etc. from a subtitle master 34, and a TOC reproduction apparatus 340 for reading the TOC from the TOC master 26.

The authoring apparatus 3 has an encoder unit 500 accommodating a video coding device 510 and a multiplexer 540, an audio encoder 520, and a subtitle encoder 530.

The authoring apparatus 3 has a control device 200A comprised of a personal computer (PC) for controlling the operation of the encoder unit 500, the audio encoder 520, and the subtitle encoder 530. Note that, the configuration of the control device 200A is similar to that of the control device 200 shown in FIG. 4.

The edit master video tape 30 is loaded in the first VTR 310 where the data recorded on the edit master video tape 30 is reproduced and input to the video coding device 510 in accordance with the control instructions of the control device 200A.

Note that, before this, the bit rate data (allocation data) etc. stored in the header of the edit master video tape 30 are first read out to the control device 200A for use for the second decoding processing in the authoring apparatus 3.

The audio master 32 is loaded in the second VTR 320 where the audio data recorded in the audio master 32 is reproduced and input to the audio encoder 520 in accordance with the control instructions of the control device 200A.

The subtitle master 34 is loaded in the subtitle reproduction device 330 where the data recorded in the subtitle master 34 is read and input to the subtitle encoder 530 in accordance with the control instructions of the control device 200A.

The TOC master 26 is loaded in the TOC reproduction device 340 where the TOC data recorded in the TOC master 26 is input to the multiplexer 540.

In the authoring apparatus 3, the video coding device 510 compresses and codes the video data S310 reproduced from the edit master video tape 30 by the first VTR 310.

The audio encoder 520 compresses and codes the audio data reproduced from the audio master 32 by the second VTR 320.

The subtitle encoder 530 compresses and codes the subtitles reproduced from the subtitle master 34 by the subtitle reproduction device 330.

The multiplexer 540 multiplexes the compressed and coded data and the TOC reproduced by the TOC reproduction device 340 under the control of the control device 200A.

The multiplexer 540 records the multiplexed data in a cutting master 38. An ECC and modulation device 600 reproduces the data recorded in the cutting master 38, adds the ECC, modulates the same, and records the resultant data on the DVD.

Below, an explanation will be made of the second compression and coding processing of the video data in the video coding device 510 by referring to FIG. 10.

Figure 10:
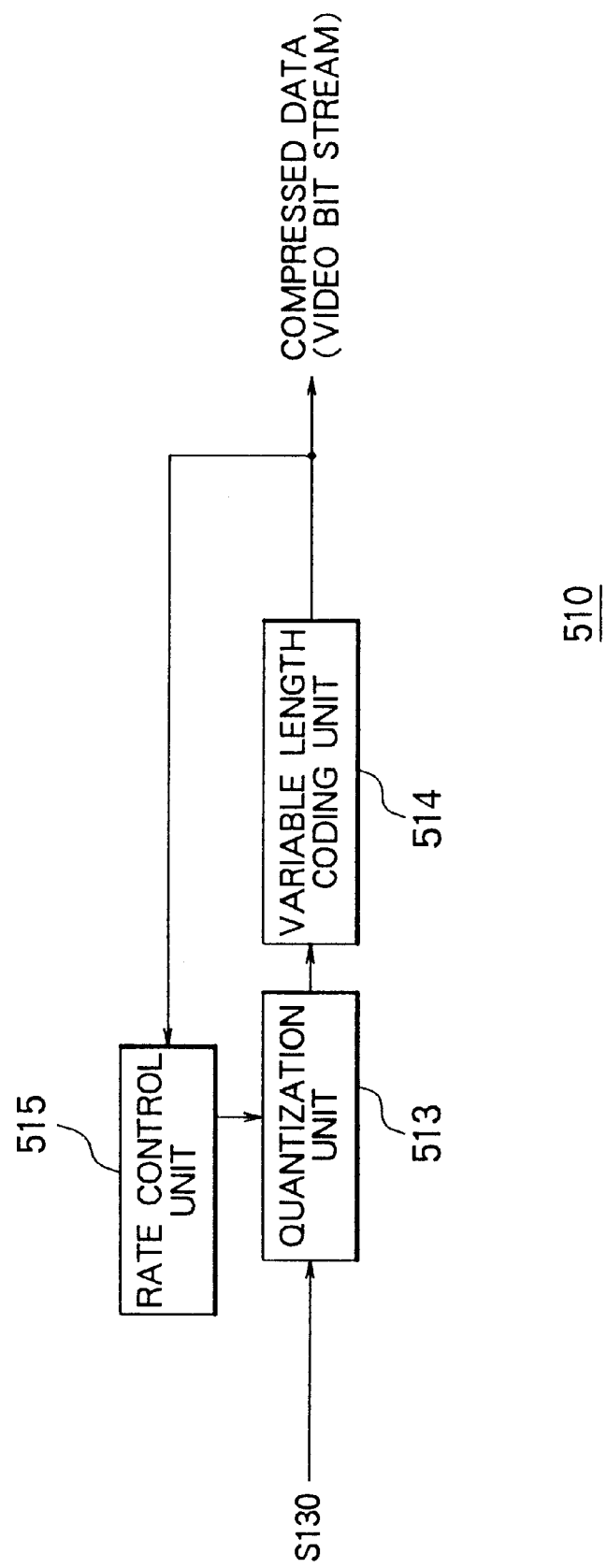
FIG. 10 is a view of the configuration of the video coding apparatus of the authoring apparatus shown in FIG. 8.

FIG. 10 is a view of the configuration of the video coding device 510 of the authoring apparatus 3 shown in FIG. 9. Note that, the video coding device 510 illustrated in FIG. 10 is basically the same as the compressing and coding apparatus 100 shown in FIG. 7. The quantization unit 513 of the video coding device 510 (FIG. 10) includes the subtraction unit 101 of the compressing and coding apparatus 100 (FIG. 7), DCT unit 102, quantization unit 103, inverse quantization unit 105, inverse DCT unit 106, adder 107, frame memory 108, motion detection unit 109, and the motion compensation unit 110.

Further, the variable length coding unit 514 of the video coding device 510 (FIG. 10) corresponds to the variable length coding unit 104 of the compressing and coding apparatus 100 (FIG. 7).

Further, the rate control unit 515 of the video coding device 510 (FIG. 10) corresponds to the rate control unit 113 of the compressing and coding apparatus 100 (FIG. 7).

Below, the video coding device 510 will be further explained by referring to FIG. 7.

The video data reproduced by the first VTR 310 (FIG. 9) is supplied to the subtraction unit 101 contained in the quantization unit 513 of the video coding device 510.

The rate control unit 515 calculates the amount of data (bit rate) of each frame of the compressed data (video bit stream) generated by the second compression and coding or a quantization value satisfying the amount of data thereof based on the first allocation data (bit rate data) recorded in the spare region (FIG. 6) of the edit master tape 32 supplied from the control device 200A.

The quantization unit 103 of the quantization unit 513 quantizes the data supplied from the DCT unit 102 based on the bit rate or the quantization value given from the rate control unit 515.

Concretely, the rate control unit 513 performs the subtraction shown in Equation 3 for every frame worth of time based on each amount of video data generated and the recording capacity of the recording medium (DVD) on which the recording is to be carried out and allocates the amount of data after the compression and coding to each frame of the video data.

$$dd(i)=S\times(d(i)/D) \qquad (3)$$

where, dd(i) is an allocation amount of data;

i is the number of the period for every time t (=one frame worth of time);

S is the capacity of the recording media;

d(i) is an amount of data generated at a first coding of the video data of the period i; and D is an amount of data generated at the first coding of the entire video data.

Further, the rate control unit 515 performs the operation shown in the following Equation 4 based on the amount of data allocated by Equation 3 to determine the amount of data (coding bit rate) after compression and coding of each frame.

$$R_v(i) \leq dd(i)/t \qquad (4)$$

where, i is the number of the period of every time t;

$R_v(i)$ is the coding bit rate of the video data of the period i; and dd(i) is the allocated amount of data.

Note that, in Equation 3 and Equation 4, the time t was set to be one frame worth of time, but it is also possible to set the same to be for example one GOP worth of time.

The rate control unit 515 controls the quantization value of the quantization performed in the quantization unit 513 so that the coding bit rate finally becomes the value found by Equation 4.

The quantization unit 513 quantizes the video data reproduced at the first VTR 310 according to the quantization value controlled by the rate control unit 515. The quantized video data is output to the variable length coding unit 104 of the quantization unit 513.

The variable length coding unit 104 of the quantization unit 513 performs variable length coding on the quantized transformation result to generate the compressed data (video bit stream) and outputs the same.

As explained above, the generated compressed data (video bit stream), the audio data compressed and coded by the audio encoder 520, and the subtitles compressed and coded by the subtitle encoder 530 are multiplexed at the multiplexer 540.

The compressed data multiplexed at the multiplexer 540 is recorded in the cutting master 38.

The compressed data recorded in the cutting master 38 is given an ECC, modulated in the ECC and modulation device 600, and recorded on the DVD.

Effect of the Second Embodiment

As explained above, according to the authoring apparatus 3, after the end of the work, even if a long period has elapsed, the first coding information is stored on the edit master video tape 30 on which the source data is recorded.

Accordingly, if the edit master tape 30 is stored in a state where the first compression and coding processing has been completed, when the coding is carried out according to need after this, the compressed data can be recorded on a DVD or other recording medium with a set storage capacity within the storage capacity thereof just by performing the second compression and coding processing by using this edit master video tape 30.

Further, also in a video-on-demand system etc. as well, even when reproducing the video data in real time by using the edit master video tape 30, the compressed data can be provided in real time with the prescribed bit rate by just performing the second compression and coding processing.

Further, the audio and/or video data compressing apparatus 2 and the authoring apparatus 3 shown as the second embodiment, as shown in FIG. 6, use a two-path system of a variable rate compression and coding system of finding the amount of data after the compression and coding of each scene i in a first compression and coding processing and then performing a second compression and coding processing so that the amount of data of each scene becomes the found value. Accordingly, the recording capacity of a DVD etc. can be effectively actively utilized and in addition the quality of the picture after the decoding and expansion is high.

Further, in the compressing and coding apparatus 100 of the audio and/or video data compressing apparatus according to the present invention, the coding is once carried out and the amount of data generated of each picture at that time is found, temporarily recorded in a FD, and finally recorded in the TC0 to TC1 of the edit master video tape 30. Then, the video coding device 510 of the authoring apparatus 3 reads the amount of data generated of each picture recorded from TC0 to TC1 of the edit master video tape 30, allocates the amount of data to each video data based on the amount of data generated, and performs the compression and coding at the video coding device 510. Accordingly, it is possible to perform suitable variable rate coding maintaining the quality of the picture with respect to each video data and then to suitably record the video data on a DVD or other recording medium having a limited recording capacity within the recording capacity.

Further, the compressing and coding apparatus 100 first processes the picture by DCT, quantization, motion compensation, etc. to compress it by reducing the spatial and time redundancy and, further, quantizes it at a predetermined fixed quantization step so that the compression rate becomes sufficiently lower than the target compression rate, and performs the first variable length compression and coding processing. Then, the video coding device 510 for performing the second compression and coding processing quantizes each video data again by using the quantization step determined for every video data and thereby obtains the video data coded with the desired rate.

Note that, the present invention is not limited to only the present embodiment. Various modifications are possible.

For example, the processing for allocating the amount of compressed data based on the amount of data generated of each video data detected at the compressing and coding apparatus 100 and determining the coding bit rate was carried out in the rate control unit 515 of the video coding device 510. However, it is also possible to perform this processing at the rate control unit 113 of the compressing and coding apparatus 100 after the first compression and coding and record the coding bit rate or the quantization value on the edit master tape.

Further, it is also possible to perform the calculation of the second coding bit rate at the control device 200A based on the amount of data generated by the first compression and coding and send the data of the found coding bit rate to the rate control unit 515 of the video coding device 510.

Further, the audio and/or video data compressing apparatus 2 and the authoring apparatus 3 shown as the second embodiment are constituted so as to record the source data which is subject to the compression and coding on a VTR tape (master video tape 26), but it is also possible to constitute them so as to record the source data on another recording medium, for example, a hard magnetic disk (HD), magneto-optical disk (MO), or digital video disk (DVD).

Further, the coding method in the compressing and coding apparatus 100 is not limited to the variable rate compression and coding system according to the above exemplified MPEG. For example, as the orthogonal transformation, a method using for example Hadamard or Fourier transformation etc. in place of the DCT can be adopted as well.

Third Embodiment

Below, a third embodiment of the present invention will be explained.

Figure 11:
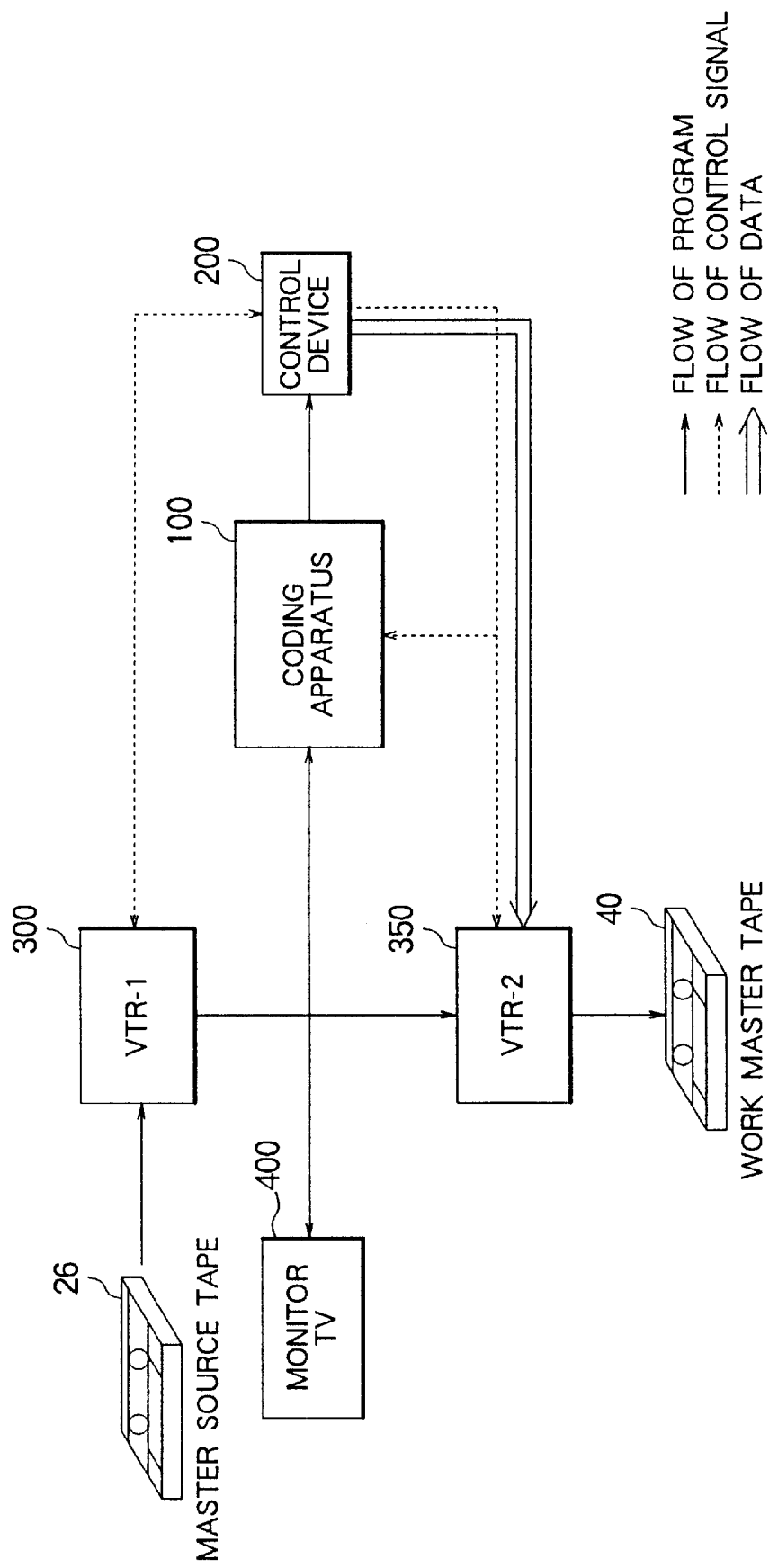
FIG. 11 is a view of the configuration of the audio and/or video data compressing apparatus of a third embodiment according to the present invention.

FIG. 11 is a view of the configuration of an audio and/or video data compressing apparatus 4 as the third embodiment of the coding apparatus of the present invention.

In the second embodiment, the bit rate data (allocation data) found at the compressing and coding apparatus 100 was recorded from TC0 to TC1 on the master video tape 26 and this used as the edit master video tape 30, but recordal of data on the master video tape 26 in this way is a problem in some cases.

Valuable source data is recorded on the master video tape, therefore to prepare against unforeseen situations such as erroneous erasing, usually, when performing the editing and compression and coding processing, first a work master tape on which the source data is copied from the master tape is prepared. The first compression and coding are carried out on the source data reproduced from this work master tape and the amount of data is calculated.

Further, the second compression and coding are carried out again with respect to the source data reproduced from the edit master tape. When the compression and coding processing is carried out in such a procedure, it is necessary to reproduce the source data three times in total so a long time is required for the compression and coding processing. For example, when compressing and coding source data of a movie of two hours duration, at least six hours will be required for the compression and coding processing.

Therefore, in the third embodiment, when preparing the work master tape, the first compression and coding are simultaneously carried out, the bit rate is calculated, and further the bit rate data (allocation data) is recorded on the work master tape.

For this purpose, other than the VTR 300 for reproducing the video data recorded on the master video tape 26, a second VTR 350 for recording the video data read from the master video tape 26 on the work master tape 40 and recording the bit rate data (allocation data) calculated at the compressing and coding apparatus 100 from TC0 to TC1 of the work master tape 40 is provided.

Note that, the compressing and coding apparatus 100, control device 200, VTR 300, and monitor TV 400 of the audio and/or video data compressing apparatus 4 shown in FIG. 11 are substantially the same as the constituent parts of the audio and/or video data compressing apparatus 2 shown in FIG. 3 given the same references.

The schematic operation of the audio and/or video data compressing apparatus 4 will be explained below.

Preparatory Work

The operator turns on the power of the monitor TV 400, first VTR 300, second VTR 350, control device 200, compressing and coding apparatus 100, etc. to bring them to the operation ready state. Then, the operator loads the master video tape 26 in the VTR 300 and rewinds the master video tape 26 to the initial state. Similarly, he loads the work master tape 40 in the second VTR 350 and rewinds this to the initial state.

Operation Start Instruction

The operator instructs the start of the first compression and coding processing by a dialog using the keyboard controller 210 in the control device 200 and the display device 214.

Coding, Display, and Generation of Allocation Data

The control device 200 controls the VTR 300 to make it perform the reproduction operation of data recorded on the master video tape 26. Further, the control device 200 makes the second VTR 350 perform the operation of recording the video data reproduced from the master video tape 26 on the work master tape 40. Further, the control device 200 controls the compressing and coding apparatus 100 and brings it to the operation ready state.

By this, the VTR 300 starts the reproduction operation, continuously reproduces the video data and bit rate data (allocation data) etc. recorded on the master video tape 26, and outputs the same to the monitor TV 400. The monitor TV 400 displays the reproduced video of the video data input from the VTR 300.

The reproduced video displayed on the monitor TV 400 is used by the operator to judge, by the naked eye, whether or not the correct video data is being reproduced. The video data reproduced at the VTR 300 is output to the monitor TV 400 and, at the same time, input to the second VTR 350 and recorded on the work master tape 40.

Further, the video data reproduced at the VTR 300 is input to also the compressing and coding apparatus 100 where it is compressed and coded with the fixed quantization value. The compressing and coding apparatus 100 finds the data of the amount of data (amount of data generated) of the video data after the compression and coding for every frame. The control device 200 stores the amount of data (amount of data generated) of the video data after the compression and coding obtained in a loaded FD (not illustrated).

Note that, the FD may store not only the bit rate data (allocation data), but also data indicating to what type of picture (picture type) is each frame compressed and coded and various information obtained at the stage of compression and coding, for example, information of frames in which scene changes occur.

During the time of this continuous reproduction operation, the operator watches the monitor TV 400 to confirm that there is no problem in the reproduced display content. If the quality of the picture displayed on the monitor TV 400 is poor etc., it is also possible for the operator to interrupt the above reproduction operation via the keyboard controller 210. In certain case, the operator may cause a part not intended to be used to be skipped so as to eliminate the reproduced data of the corresponding part.

Reproduction End

When the VTR 300 finishes reproducing all of the video data recorded on the master video tape 26, the VTR 300 transmits an end signal to the control device 200. The control device 200 displays information indicating that the reproduction of the video data is ended on the display device 214. By this display, the operator learns that the VTR 300 has ended the reproduction of the video data. When the operator who has been watching the display content of the monitor TV 400 confirms that there is no problem in the display content, he can understand that the reproduction operation was correctly carried out.

The operator instructs the rewinding of the master video tape 26 loaded in the first VTR 300 and the work master tape 40 loaded in the second VTR 350 to the control device 200. The VTR 300 and the second VTR 350 perform the rewinding.

Note that, it is also possible for the control device 200 to automatically instruct the rewinding of the master video tape 26 and the work master tape 40 to the VTR 300 and 350 when receiving an end signal from the VTR 300.

Recording of Bit Rate Data

When the rewinding is ended, the second VTR 350 outputs information indicating that the rewinding of the work master tape 40 has ended to the control device 200. The control device 200 records the bit rate data (allocation data) for every frame recorded on the FD from TC0 to TC1 of the rewound work master tape 40 (refer to FIG. 6). Concretely, the bit rate data (allocation data) for every frame is stored in the video track or the audio track of TC0 to TC1 of the work master tape 40. Note that, in the region of TC0 to TC1, not only the amount of data generated for every frame mentioned above, but also various information which is obtained at the stage of compression and coding and stored on the FD can be stored.

Ending Operation

After the control device 200 writes the bit rate data (allocation data) from TC0 to TC1 of the work master tape 40, the control device 200 outputs an instruction for rewinding of the work master tape 40 up to the tape top to the VTR 350.

In this way, the video data recorded on the master video tape 26 is recorded on the work master tape 40 and further the bit rate data obtained by the compression and coding processing is recorded from TC0 to TC1 of the work master tape 40.

This work master tape 40 is loaded in the first VTR 310 in place of the edit master tape 30 in the authoring apparatus 3 shown in FIG. 9. The bit rate data (allocation data) etc. stored in the work master tape 40 are first read and stored in the control device 200 and then the above second compression and coding processing is carried out.

Further, after the first compression and coding processing, it is also possible to find the amount of allocated bits or quantization value at the second compression and coding from the amount of generated bits and record the same on the work master tape.

Further, it is also possible not to record the data of the amount of data generated by the first compression and coding on the work master tape, but to record the same in only the floppy disk (FD) in the control device 200, load this floppy disk in the control device 200A at the second compression and coding, and read the data of the amount of data generated from the floppy disk.

In addition to the source data, the bit rate data etc. used for the second coding are recorded on the work master tape 40 while storing the master video tape 26 as it, therefore the master video tape 26 can be stored as it is and the time required for the compression and coding can be greatly shortened.

Figure 12:
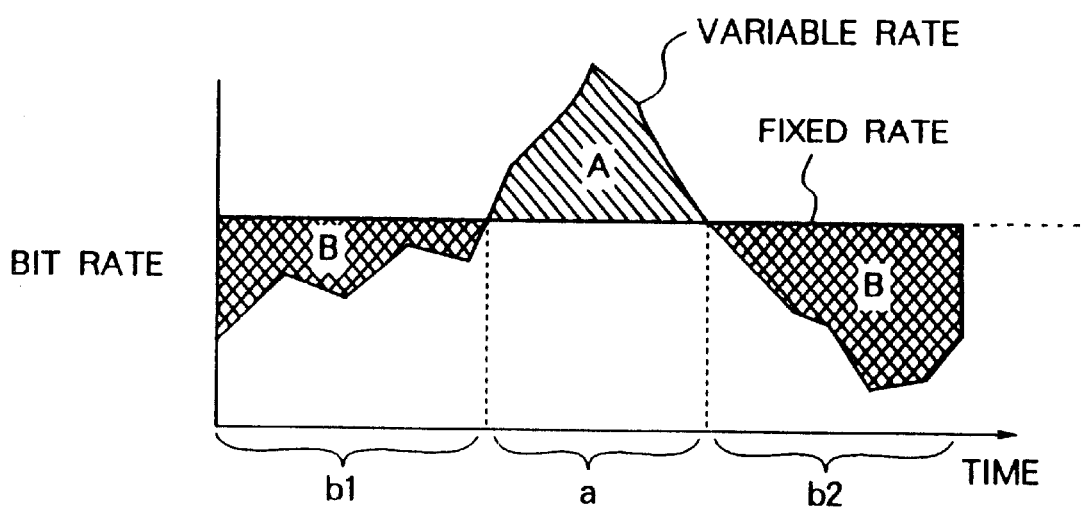
FIG. 12 is a view of the relationship between a reproduction time and coding bit rate when the video data of a certain program is coded by the fixed rate compression and coding system and the variable rate compression and coding system, respectively.

FIG. 12 is a view showing the relationship between the reproduction time and the coding bit rate when the video data of a certain program is coded by the fixed rate compression and coding system and the variable rate compression and coding system, respectively.

In the fixed rate compression and coding system, the compression and coding rate (or bit rate) is always constant.

On the other hand, the audio and/or video data compressing apparatuses 1, 2, and 4 and the authoring apparatus 3 shown in the first to third embodiments use the variable rate compression and coding system and change the compression and coding rate (bit rate) according to the complexity of the image so as to maintain the quality of the picture as a whole when expanding and decoding the compressed and coded video data. For example, the period a is the period of the relatively difficult video data for which the motion is vigorous, therefore the amount of data generated by coding becomes large (bit rate becomes high) due to the coding, while the periods $b_1$ and $b_2$ are periods of relatively simple video data for which the motion is small, therefore the coding can be carried out by small coding data (low bit rate).

As explained above, according to the audio and/or video data compressing apparatus according to the present invention and the method of same, the data which is obtained by the first coding processing and is used for the second coding processing is recorded on an edit master video tape or work master tape or the master video tape per se, therefore if these video tapes are used, data which has been compressed and coded in real time can be provided at any time.

In addition, data which is compressed and coded in real time can be recorded on a DVD or other recording medium having a limited recording capacity with the rate with which the data can be stored or can be transmitted to a transmission system for transmitting the data with the prescribed bit rate.

INDUSTRIAL APPLICABILITY

The audio and/or video data compressing apparatus according to the present invention and the method of the same can be effectively utilized in recording apparatuses for compressing and coding uncompressed video data to an amount of data of less than the recording capacity and recording the same on a magneto-optical disk (MO), a digital video disk (DVD), or the like and in a cable television system for sending the compressed data compressed and coded to a data rate of less than the transmission capacity to the home of the viewer.

LIST OF REFERENCES 1, 2, 4 audio and/or video data compressing apparatuses;
3 authoring apparatus
   10, 12 VTR apparatus;
   16 switch circuit;
   18 encoder;
      180 control circuit;
      182 compression circuit;
      184 quantization circuit;
      186 RLL coding circuit;
   20 recording apparatus;
   22 control device;
   24 monitor device;
   26 master video tape;
   28 work video tape;
   30 edit master tape;
   200, 200A control devices;
   300 VTR;
   400 monitor TV;
   510 video coding device;
   32 audio master:
   34 subtitle master;
   36 TOC master;
   38 cutting master;
   310, 320 VTR;
   330 subtitle reproduction device;
   340 TOP reproduction device;
   500 encoder unit;
   510 video coding device;
   520 audio encoder;
   530 subtitle encoder;
   540 multiplexer; and
   600 ECC and modulation device.

What is claim is:

1. An audio and/or video data compressing apparatus comprising:

an audio and/or video data reproducing means for reproducing audio and/or video data from a first recording medium on which audio data and video data or either of the same (audio and/or video data) are recorded;

a first and/or video data recording means for recording the audio and/or video data reproduced by the audio and/or video data reproducing means on a second recording medium;

an audio and/or video data compressing means for quantizing audio and/or video data and compressing said audio and/or video data a first time to generate first compressed data and compressing said audio and/or video data a second time to generate second compressed data; and a quantization value calculating means for calculating a quantization value for making an amount of said second compressed data a desired amount of data based on an amount of said first compressed data, said first compressed data being generated using a predetermined quantization value, wherein said first audio and/or video data recording means records in a predetermined area of the first recording medium an indication of the amount of said first compressed data, an indication of a frame in which a scene change occurs and a bit rate for said frame in which a scene change occurs.

2. An audio and/or video data compressing apparatus as set forth in claim 1, wherein the quantization value calculating means calculates the quantization value for each group of a predetermined number of video frames of said audio and/or video data.

3. An audio and/or video data compressing apparatus as set forth in claim 1, wherein said second compressed data is generated by recording the audio and/or video data onto said second recording medium and using said compressing means to quantize the audio and/or video data recorded on the second recording medium based on the quantization value calculated by the quantization value calculating means.

4. An audio and/or video data compressing apparatus as set forth in claim 3, wherein said apparatus further comprises a second audio and/or video data recording means for recording said second compressed data on a third recording medium and the quantization value calculating means calculates the quantization value so that the amount of said second compressed data does not exceed the recording capacity of the third recording medium.

5. An audio and/or video data compressing apparatus as set forth in claim 3, wherein the first audio and/or video data recording means records the quantization value calculated by the quantization value calculating means on the second recording medium.

6. An audio and/or video data compressing apparatus as set forth in claim 4, wherein the first recording means records the quantization value calculated by the quantization value calculating means onto the second recording medium at a position preceding the second compressed data.

7. An audio and/or video data compressing apparatus, comprising:

an audio and/or video data reproducing means for reproducing audio and/or video data from a first recording medium on which audio data and video data or either of the same (audio and/or video data) are recorded;

an audio and/or video data recording means for recording the audio and/or video data reproduced by the audio and/or video data reproducing means on a second recording medium; and an audio and/or video data compressing means for quantizing audio and/or video data and comprising said audio and/or video data a first time to generate first compressed data and compressing said audio and/or video data a second time to generate second compressed data, wherein the audio and/or video data recording means records in a predetermined area of the second recording medium an indication of the amount of said first compressed data, an indication of a frame in which a scene change occurs and a bit rate for said frame in which a scene change occurs.

8. An audio and/or video data compressing apparatus comprising:

an audio and/or video data reproducing means for reproducing audio and/or video data from a first recording medium on which the audio data and video data or either of the them same (audio and/or video data) are recorded;

an audio and/or video data recording means for recording the audio and/or video data reproduced by the audio and/or video data reproducing means on a second recording medium; and an audio and/or video data compressing means for quantizing audio and/or video data and compressing said audio and/or video data a first time to generate first compressed data and compressing said audio and/or video data a second time to generate second compressed data;

wherein the audio and/or video data recording means records in a predetermined area of the second recording medium an indication of the amount of said first compressed data, an indication of a frame in which a scene change occurs and a bit rate for said frame in which a scene change occurs; and wherein the audio and/or video data recording means further records data indicating the amount of said second compressed data on a third recording medium.

9. An audio and/or video data compressing apparatus, comprising:

a first audio and/or video data compressing means for reproducing audio and/or video data from a first recording medium on which the audio data and video data or either of the same (audio and/or video data) are recorded and quantizing and compressing the same to thereby generate compressed data;

a compressed data amount calculating means for calculating an amount of said compressed data; and a recording means for recording in a predetermined area of the first recording medium an indication of the amount of said compressed data calculated by the compressed data amount calculating means, an indication of a frame in which a scene change occurs and a bit rate for said frame in which a scene change occurs.

10. An audio and/or video data compressing apparatus as set forth in claim 9, wherein the recording means records the indication of the amount of compressed data calculated by the compressed data amount calculating means in the first recording medium at a position preceding the position where the audio and/or video data is recorded.

11. An audio and/or video data compressing apparatus as set forth in claim 9, further comprising a second audio and/or video data compressing means for reproducing the amount of said compressed data and the audio and/or video data recorded on the first recording medium by the recording means and quantizing and compressing the reproduced audio and/or video data based on the reproduced amount of said compressed data to generate second compressed data.

12. An audio and/or video data compressing apparatus as set forth in claim 11, wherein the recording means records a quantization value used for quantization in the second audio and/or video data compressing means on the first recording medium, wherein said quantization value is based on the amount of said compressed data.

13. An audio and/or video data compressing apparatus comprising:

an audio and/or video data compressing means for producing audio and/or video data from a first recording medium on which the audio data and video data or either of the same (audio and/or video data) are recorded and quantizing and compressing the reproduced data to generate compressed data; and a recording means for recording in a predetermined area of the first recording medium an indication of the amount of compressed data generated by the audio and/or video data compressing means, an indication of a frame in which a scene change occurs and a bit rate for said frame in which a scene change occurs.

14. An audio and/or video data compressing apparatus as set forth in claim 13, wherein the recording means records the indication of the amount of compressed data calculated by a compressed data amount calculating means in the first recording medium at a position before the position where the audio and/or video data is recorded.

15. An audio and/or video data compressing method including the steps of:

reproducing audio and/or video data from a first recording medium on which the audio data and video data or either of the same (audio and/or video data) are recorded;

recording the reproduced audio and/or video data on a second recording medium;

quantizing the reproduced audio and/or video data and compressing the same a first time to generate first compressed data, and quantizing and compressing the reproduced audio and/or video data a second time to generate second compressed data;

recording in a predetermined area of the first recording medium an indication of the amount of said first compressed data, an indication of a frame in which a scene change occurs and a bit rate for said frame in which a scene change occurs; and calculating a quantization value for making the amount of said second compressed data a desired amount of data based on said indication of the amount of the first compressed data, said first compressed data being generated using a quantization value determined in advance of compressing the first compressed data.

16. An audio and/or video data compressing method including the steps of:

reproducing audio and/or video data from a first recording medium on which the audio data and video data or either of the same (audio and/or video data) are recorded;

recording the reproduced audio and/or video data on a second recording medium;

quantizing the reproduced audio and/or video data and compressing the same a first time to generate first compressed data, and quantizing and compressing the reproduced audio and/or video data a second time to generate second compressed data; and recording in a predetermined area of the second recording medium data indicating the amount of the first compressed data, an indication of a frame in which a scene change occurs and a bit rate for said frame in which a scene change occurs.

17. An audio and/or video data compressing method including the steps of:

reproducing audio and/or video data from a first recording medium on which the audio data and video data or either of the same (audio and/or video data) are recorded;

recording the reproduced audio and/or video data on a second recording medium;

quantizing the reproduced audio and/or video data and compressing the same a first time to generate first compressed data, and quantizing and compressing the reproduced audio and/or video data a second time to generate second compressed data; and further recording in a predetermined area of a third recording medium data indicating the amount of the first compressed data, an indication of a frame in which a scene change occurs and a bit rate for said frame in which a scene change occurs.

18. An audio and/or video data compressing method including the steps of:

reproducing audio and/or video data from a first recording medium on which the audio data and video data or either of the same (audio and/or video data) are recorded;

quantizing and compressing the same to generate compressed data;

calculating an amount of said compressed data; and recording in a predetermined area of the first recording medium an indication of the calculated amount of said compressed data, an indication of a frame in which a scene change occurs and a bit rate for said frame in which a scene change occurs.

19. An audio and/or video data compressing method including the steps of:

reproducing audio and/or video data from a first recording medium on which the audio data and video data or either of the same (audio and/or video data) are recorded;

quantizing and compressing the reproduced data to generate compressed data; and recording in a predetermined area of the first recording medium an indication of the amount of said compressed data, an indication of a frame in which a scene change occurs and a bit rate for said frame in which a scene change occurs.

* * * * *

UNITED STATES PATENT AND TRADEMARK OFFICE
CERTIFICATE OF CORRECTION

PATENT NO. : 6,389,224 B2  Page 1 of 1
DATED : May 14, 2002
INVENTOR(S) : Mori et al.

It is certified that error appears in the above-identified patent and that said Letters Patent is hereby corrected as shown below:

<u>Title page, Item [54] and Column 1, lines 1-3,</u>
Change the Title of the Patent to:

-- DEVICE FOR COMPRESSING AUDIO AND VIDEO
   DATA AND METHOD THEREFOR --

Signed and Sealed this

Eleventh Day of February, 2003

JAMES E. ROGAN
*Director of the United States Patent and Trademark Office*